(12) United States Patent  (10) Patent No.: US 7,446,753 B2
Fitch et al.  (45) Date of Patent: Nov. 4, 2008

(54) HAND HELD COMPUTER DEVICE

(75) Inventors: Timothy R. Fitch, Syracuse, NY (US); Larry K. Hooks, Jr., Charlotte, NC (US); Brian V. Conti, Matthews, NC (US); Brian Dobeck, Matthews, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 672 days.

(21) Appl. No.: 10/938,416

(22) Filed: Sep. 10, 2004

(65) Prior Publication Data

US 2006/0054704 A1  Mar. 16, 2006

(51) Int. Cl.
G09G 5/00 (2006.01)

(52) U.S. Cl. .................. 345/156; 345/158; 345/168; 345/55

(58) Field of Classification Search ................ 345/156, 345/158, 168, 55
See application file for complete search history.

(56) References Cited

U.S. PATENT DOCUMENTS

| 4,020,527 | A |   | 5/1977  | O'Neill         |        |
|-----------|---|---|---------|-----------------|--------|
| D248,946  | S |   | 8/1978  | Koenig          |        |
| D249,345  | S |   | 9/1978  | Oliveira et al. |        |
| 4,165,554 | A | * | 8/1979  | Faget           | 16/426 |
| D258,956  | S |   | 4/1981  | Chadima, Jr.    |        |
| 4,305,508 | A |   | 12/1981 | Rodgers         |        |
| 4,335,303 | A |   | 6/1982  | Call            |        |
| D272,348  | S |   | 1/1984  | Gombrich et al. |        |
| 4,432,521 | A |   | 2/1984  | Douglas         |        |
| D274,249  | S |   | 6/1984  | Polhemus        |        |
| 4,505,395 | A |   | 3/1985  | Nathan          |        |
| 4,570,057 | A |   | 2/1986  | Chadima, Jr. et al. |   |
| 4,621,189 | A |   | 11/1986 | Kumar et al.    |        |
| 4,654,818 | A |   | 3/1987  | Wetterau, Jr.   |        |

(Continued)

FOREIGN PATENT DOCUMENTS

EP 0 565 245 A1 3/1993

(Continued)

OTHER PUBLICATIONS

U.S. Appl. No. 29/291,967, as filed specification including drawings, filed Sep. 21, 2007, 4 pages.

(Continued)

*Primary Examiner*—Richard Hjerpe
*Assistant Examiner*—Leonid Shapiro
(74) *Attorney, Agent, or Firm*—Marjama Muldoon Blasiak & Sullivan LLP

(57) ABSTRACT

The invention is a hand held computer device having a housing including a top or upper surface, a lower surface and finger saddle ridge protruding downwardly from the lower surface. The finger saddle ridge has two finger receiving surfaces and is sized to accommodate a pair of human fingers such that a first finger contacts the front surface of the finger saddle and a second finger contacts the rear surface of the finger saddle. When an operator's fingers straddle the finger saddle ridge, the hand held computer device pivots about a pivot point defined between the fingers. The device can thus be readily maneuvered into a downward pivoting position, highly useful for decoding bar codes, and an upward pivoting position, highly useful for display viewing and applications involving display viewing such as web browsing and data input.

55 Claims, 13 Drawing Sheets

U.S. PATENT DOCUMENTS

| | | |
|---|---|---|
| 4,694,182 A | 9/1987 | Howard |
| 4,703,161 A | 10/1987 | McLean |
| D293,795 S | 1/1988 | Yamamoto |
| D297,429 S | 8/1988 | Pedinielli et al. |
| D297,430 S | 8/1988 | Beard et al. |
| D297,431 S | 8/1988 | Beard et al. |
| D297,432 S | 8/1988 | Stant et al. |
| 4,766,299 A | 8/1988 | Tierney et al. |
| D297,939 S | 10/1988 | Bradbury et al. |
| D299,234 S | 1/1989 | Kajita |
| D299,235 S | 1/1989 | Feger et al. |
| 4,801,786 A | 1/1989 | Stobbe |
| 4,818,847 A | 4/1989 | Hara et al. |
| 4,818,856 A | 4/1989 | Matsushima et al. |
| 4,835,372 A | 5/1989 | Gombrich et al. |
| 4,841,129 A | 6/1989 | Tawara et al. |
| D302,265 S | 7/1989 | Seigner et al. |
| D302,269 S | 7/1989 | Kelly |
| 4,850,009 A | 7/1989 | Zook et al. |
| 4,855,746 A | 8/1989 | Stacey |
| D303,663 S | 9/1989 | Kumar et al. |
| D305,884 S | 2/1990 | Krichever et al. |
| 4,916,441 A | 4/1990 | Gombrich |
| D308,865 S | 6/1990 | Weaver et al. |
| 4,930,848 A | 6/1990 | Knowles |
| D308,968 S | 7/1990 | Morun et al. |
| D309,729 S | 8/1990 | Tanabe |
| D311,393 S | 10/1990 | Weaver et al. |
| D312,622 S | 12/1990 | Alden et al. |
| D312,628 S | 12/1990 | Yokoi et al. |
| D313,401 S | 1/1991 | Tanabe |
| D315,901 S | 4/1991 | Knowles |
| D316,854 S | 5/1991 | Okuyama et al. |
| 5,023,438 A | 6/1991 | Wakatsuki et al. |
| 5,023,824 A | 6/1991 | Chadima, Jr. et al. |
| D319,228 S | 8/1991 | Mori et al. |
| D320,013 S | 9/1991 | Siemiatkowski et al. |
| 5,046,739 A | 9/1991 | Reichow |
| 5,081,343 A | 1/1992 | Chadima, Jr. et al. |
| D331,576 S | 12/1992 | Yamanaka |
| D332,604 S | 1/1993 | Miyake et al. |
| 5,187,354 A | 2/1993 | Bengtsson |
| 5,191,197 A | 3/1993 | Metlitsky et al. |
| 5,202,817 A | 4/1993 | Koenck et al. |
| 5,216,233 A | 6/1993 | Main et al. |
| 5,218,187 A | 6/1993 | Koenck et al. |
| 5,218,188 A | 6/1993 | Hanson |
| D337,316 S | 7/1993 | Ruiten |
| 5,227,614 A | 7/1993 | Danielson et al. |
| D338,658 S | 8/1993 | Suzuki |
| 5,237,162 A | 8/1993 | Harden et al. |
| D340,034 S | 10/1993 | Hofstetter et al. |
| D340,707 S | 10/1993 | Swartz |
| D341,584 S | 11/1993 | Shepard et al. |
| D341,825 S | 11/1993 | Hamilton |
| D341,838 S | 11/1993 | Kasch et al. |
| 5,260,553 A | 11/1993 | Rockstein et al. |
| 5,264,956 A | 11/1993 | Tzu-Chin |
| D342,256 S | 12/1993 | Payne et al. |
| D343,170 S | 1/1994 | Gilpin et al. |
| 5,281,801 A | 1/1994 | Shepard et al. |
| 5,288,984 A | 2/1994 | Ito et al. |
| 5,288,985 A | 2/1994 | Chadima, Jr. et al. |
| 5,291,009 A | 3/1994 | Roustaei |
| 5,294,782 A | 3/1994 | Kumar |
| D346,793 S | 5/1994 | Iino et al. |
| D350,334 S | 9/1994 | Kumar et al. |
| D351,151 S | 10/1994 | Park et al. |
| 5,352,935 A | 11/1994 | Etoh |
| D352,936 S | 11/1994 | Karlin |
| D352,939 S | 11/1994 | Karlin |
| D353,134 S | 12/1994 | Etoh |
| D353,704 S | 12/1994 | Bhambra |
| D355,904 S | 2/1995 | Swartz et al. |
| D356,299 S | 3/1995 | Hamilton et al. |
| 5,410,141 A | 4/1995 | Koenck et al. |
| D357,917 S | 5/1995 | Ito et al. |
| D358,588 S | 5/1995 | LaManna et al. |
| D359,040 S | 6/1995 | Nakamura et al. |
| 5,424,525 A | 6/1995 | Rockstein et al. |
| 5,430,284 A | 7/1995 | Numazaki |
| 5,432,510 A | 7/1995 | Matthews |
| D361,564 S | 8/1995 | Inaba |
| D361,565 S | 8/1995 | LaManna et al. |
| D363,287 S | 10/1995 | Laituri |
| 5,457,307 A | 10/1995 | Dumont |
| 5,477,042 A | 12/1995 | Wang |
| 5,479,001 A | 12/1995 | Kumar |
| D366,043 S | 1/1996 | Hara et al. |
| D366,044 S | 1/1996 | Hara et al. |
| 5,481,265 A | 1/1996 | Russell |
| D366,876 S | 2/1996 | Labohm |
| D367,060 S | 2/1996 | Augaitis et al. |
| 5,489,770 A | 2/1996 | Kadota et al. |
| 5,530,619 A | 6/1996 | Koenck et al. |
| D372,245 S | 7/1996 | Brooks |
| D372,246 S | 7/1996 | Renk et al. |
| D374,869 S | 10/1996 | Karlin |
| 5,616,906 A | 4/1997 | Kumar |
| D383,124 S | 9/1997 | Lanzaro et al. |
| 5,668,574 A | 9/1997 | Jarlance-Huang |
| 5,679,943 A | 10/1997 | Schultz et al. |
| D386,152 S | 11/1997 | Warneke |
| D390,554 S | 2/1998 | Larson et al. |
| D391,234 S | 2/1998 | Chacon et al. |
| D392,282 S | 3/1998 | Ahearn et al. |
| D393,834 S | 4/1998 | Margalit et al. |
| 5,748,455 A | 5/1998 | Phillips et al. |
| D394,855 S | 6/1998 | Ahearn et al. |
| 5,763,824 A | 6/1998 | King et al. |
| D396,215 S | 7/1998 | Inukai |
| D398,903 S | 9/1998 | Chacon et al. |
| 5,801,918 A * | 9/1998 | Ahearn et al. ............... 361/683 |
| 5,811,050 A | 9/1998 | Gabower |
| 5,828,052 A | 10/1998 | Reynolds et al. |
| D400,872 S | 11/1998 | Ahearn et al. |
| 5,831,819 A | 11/1998 | Chacon et al. |
| D405,071 S | 2/1999 | Gambaro |
| D405,075 S | 2/1999 | Ahearn et al. |
| D405,076 S | 2/1999 | Ahearn et al. |
| D414,470 S | 9/1999 | Chacon et al. |
| D414,760 S | 10/1999 | Hetfield et al. |
| 5,969,328 A | 10/1999 | Kumar et al. |
| 6,016,083 A | 1/2000 | Satoh |
| D422,622 S | 4/2000 | Ono |
| D428,883 S | 8/2000 | Mizusugi et al. |
| D429,226 S | 8/2000 | Siddoway et al. |
| D430,158 S | 8/2000 | Bhatia et al. |
| D430,159 S | 8/2000 | Bhatia et al. |
| 6,105,871 A | 8/2000 | Campo et al. |
| 6,109,528 A | 8/2000 | Kumar et al. |
| D431,562 S | 10/2000 | Bhatia et al. |
| 6,138,914 A | 10/2000 | Campo |
| D436,104 S | 1/2001 | Bhatia et al. |
| D439,898 S | 4/2001 | Ober et al. |
| D447,141 S | 8/2001 | Itoh et al. |
| 6,297,969 B1 | 10/2001 | Mottahed |
| D454,349 S | 3/2002 | Makidera et al. |
| D456,806 S | 5/2002 | Ahearn et al. |
| D457,883 S | 5/2002 | Sugioka et al. |
| 6,390,366 B1 * | 5/2002 | Heidenreich et al. ........ 235/384 |
| D458,265 S | 6/2002 | Fitch |
| D460,068 S | 7/2002 | Lanzaro et al. |
| D462,357 S | 9/2002 | Jenkins |

| | | |
|---|---|---|
| D463,421 S | 9/2002 | Lanzaro et al. |
| D463,425 S | 9/2002 | Jenkins |
| D464,962 S | 10/2002 | MacGregor et al. |
| 6,466,198 B1 * | 10/2002 | Feinstein .................... 345/158 |
| D465,219 S | 11/2002 | Tamaki et al. |
| D466,116 S | 11/2002 | Bhatia et al. |
| 6,483,719 B1 | 11/2002 | Bachman |
| D467,918 S | 12/2002 | Fitch et al. |
| 6,490,438 B1 | 12/2002 | Wu |
| D470,842 S | 2/2003 | Bhatia et al. |
| D473,872 S | 4/2003 | Ausems et al. |
| D475,047 S | 5/2003 | Choi et al. |
| D476,330 S | 6/2003 | Ahearn et al. |
| D480,697 S | 10/2003 | Lee et al. |
| 6,633,483 B2 | 10/2003 | Akagi et al. |
| D492,303 S | 6/2004 | Schlieffers et al. |
| D492,305 S | 6/2004 | Choi et al. |
| D492,681 S | 7/2004 | Ahearn et al. |
| D494,584 S | 8/2004 | Schlieffers et al. |
| D494,593 S | 8/2004 | Wulff et al. |
| D496,366 S | 9/2004 | Croley et al. |
| D498,475 S | 11/2004 | Byun |
| D501,207 S | 1/2005 | Ohta et al. |
| D505,423 S | 5/2005 | Ahearn et al. |
| 7,077,328 B2 | 7/2006 | Krishnaswamy et al. |
| 2002/0166682 A1 | 11/2002 | Watchko et al. |
| 2003/0121981 A1 | 7/2003 | Slutsky et al. |

FOREIGN PATENT DOCUMENTS

| | | |
|---|---|---|
| EP | 0 354 814 B1 | 12/1994 |
| EP | 0 531 645 B1 | 3/1997 |
| EP | 0 650 619 | 10/2003 |
| GB | 2 244 546 A | 12/1991 |
| JP | 11/37389 | 2/1999 |
| WO | WO 90/08392 A1 | 7/1990 |
| WO | WO 94/02910 A1 | 2/1994 |
| WO | WO 94/12999 A1 | 6/1994 |

OTHER PUBLICATIONS

First Preliminary Amendment Filed Feb. 28, 2008 for U.S. Appl. No. 29/291,967, 14 pages.

* cited by examiner

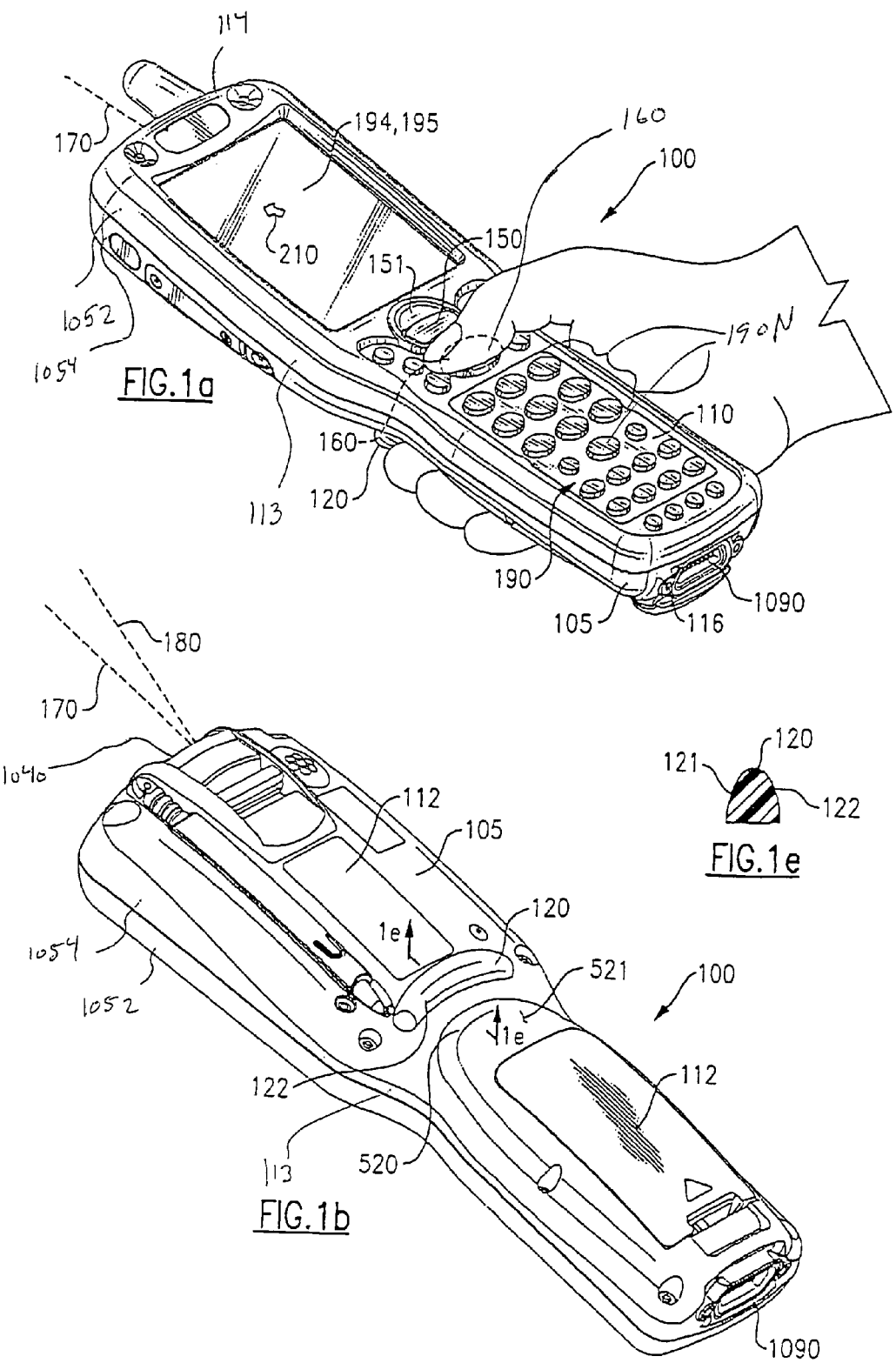

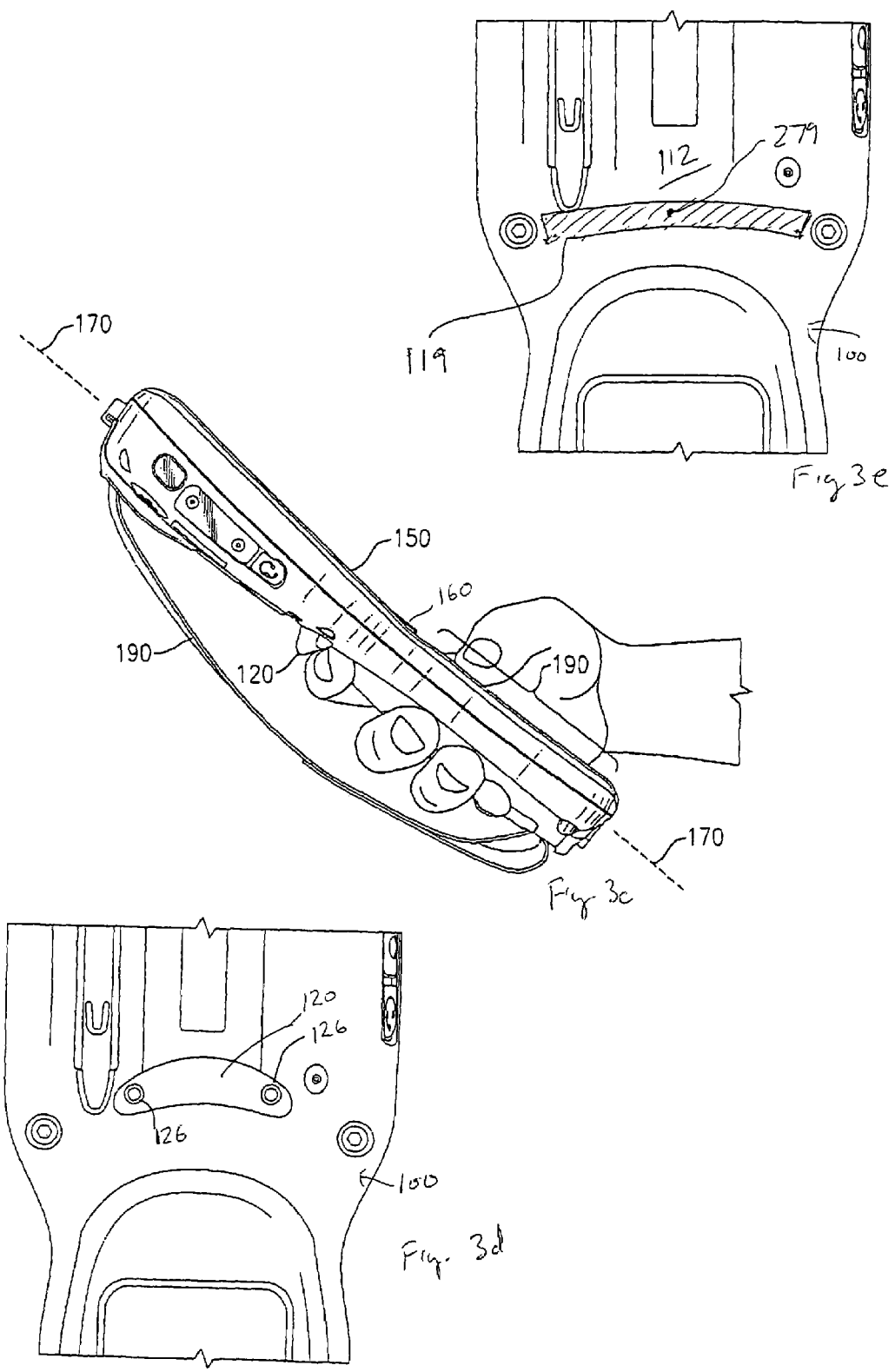

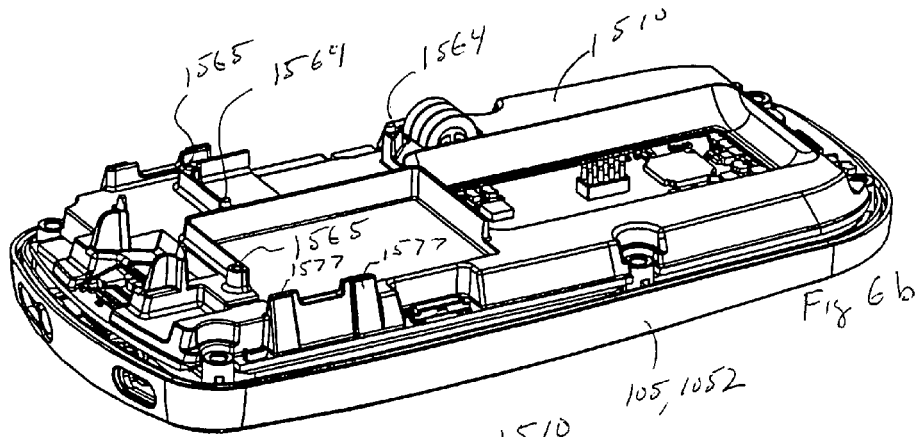
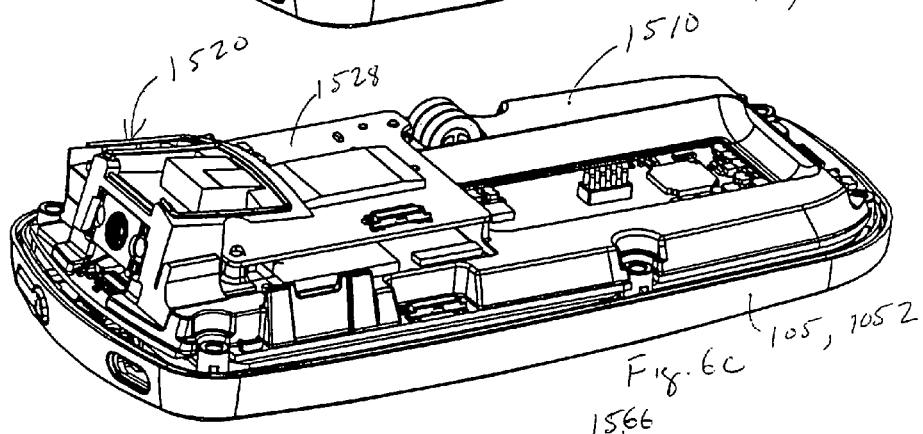
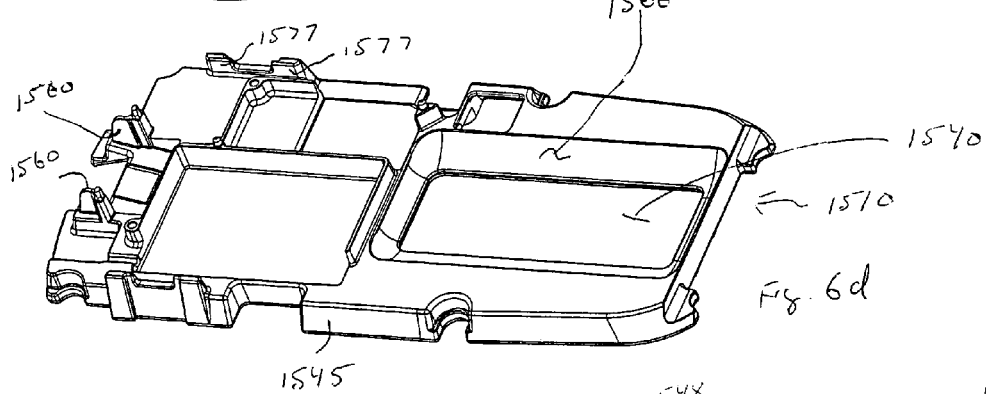
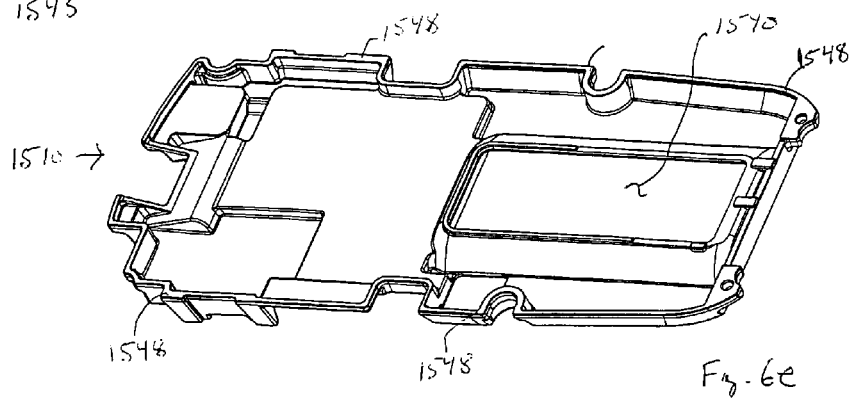

HAND HELD COMPUTER DEVICE

FIELD OF THE INVENTION

The present invention relates to a hand held computer device in general and specifically to features relating to a housing for a hand held computer.

BACKGROUND OF THE PRIOR ART

Hand held computers are growing in complexity. A particular class of hand held computers known as portable data terminals (PDTs) are now used in a wide variety of applications including shipping and inventory applications. Many PDTs now incorporate bar code reading functionality for reading bar codes.

Another class of hand held computers, known as personal data assistants (PDAs) are now widely used in offices, and also in industrial settings such as in shipping or inventory applications. Many PDTs currently available have the form factor formerly associated with PDAs. PDAs, like PDTs often are equipped with bar code reading functionality.

The bar code reading functionality in PDTs is provided typically either by a solid state imaging assembly, coupled to a software decode module or by a laser scan module coupled to a software decode module. When a bar code reading functionality is provided by an imaging assembly including a two dimensional image sensor it is common for a portable computer, whether a PDT or a PDA to have image capture functionality.

Yet another class of hand held computers is the cellular telephone. With increasing frequency cellular telephones are taking on increased functionality formerly associated with PDAs and PDTs. For example, it is common now for cellular phones to have image capture functionality.

It is also common now for all types of hand held computers—whether PDTs, PDAs, cellular phones or of another class to have displays, keyboards, and web browsing functionality. A web browser incorporated in a hand held computer allows the operator of the hand held computer to navigate between web pages.

While the functionality of hand held computer devices continues to improve, the housings for such devices have remained relatively constant. A significant exception is the computer housing described in U.S. Pat. No. 5,801,918 entitled, "Ergonomic Housing For Micro Computer," owned by the assignee of the present invention. In that patent a specially designed hand held computer housing is described which is shaped complementary with a human hand, significantly improving the ease of use of the computer device.

There continues to be need for an improved housing design for hand held computers, which adapts the computer device for comfort and for ease of use in a variety of different applications.

SUMMARY OF THE INVENTION

In accordance with its major aspects and broadly stated the invention is a hand held computer device having a housing including a surface, a lower surface and finger saddle ridge protruding downwardly from the lower surface. The finger saddle ridge has two finger receiving surfaces and is sized to accommodate a pair of human fingers such that a first finger contacts the front surface of the finger saddle ridge and a second finger contacts the rear surface of the finger saddle ridge. When an operator's fingers straddle the finger saddle ridge, the hand held computer device pivots about a pivot point defined between the fingers. The device can thus be readily maneuvered into a downward pivoting position, highly useful for decoding bar codes, and an upward pivoting position, highly useful for web browsing and data input.

These and other details and advantages will become apparent from the detailed description of the preferred embodiment herein below.

BRIEF DESCRIPTION OF THE DRAWINGS

For a further understanding of these and objects of the invention, reference will be made to the following detailed description of the invention which is to be read in connection with the accompanying drawing, wherein:

FIG. 1a is a top perspective view of a hand held computer device according to the invention;

FIG. 1b is a bottom perspective view of a hand held computer device according to the invention;

FIG. 1e is a cross sectional view taken along line 1e-1e of FIG. 1b;

FIG. 3c is a perspective view of a hand held computer device according to the invention illustrating grasping of the device in a second grasping position;

FIG. 3d is a bottom view of a hand held computer device according to the invention showing a finger saddle ridge attached to a major body of a computer housing by way of screws;

FIG. 3e is a bottom view of a hand held computer device according to the invention showing a line disposed on a housing lower surface;

FIGS. 6b-6c are views of an embodiment of the invention in a partially assembled state;

FIG. 6d is a bottom perspective view of a can frame according to the invention;

FIG. 6e is a top perspective view of a can frame according to the invention illustrating a hollow interior thereof;

FIG. 7b is a first rear perspective view of the embodiment of FIG. 7a;

FIG. 7c is a second rear perspective view of the embodiment of FIG. 7a;

FIG. 7d is a first side view of the embodiment of FIG. 7a;

FIG. 7e is a top view of the embodiment of FIG. 7a;

FIG. 7f is a second side view of the embodiment of FIG. 7a;

FIG. 7g is a bottom view of the embodiment of FIG. 7a;

FIG. 7h is a front view of the embodiment of FIG. 7a;

FIG. 7i is a rear view of the embodiment of FIG. 7a.

DESCRIPTION OF THE INVENTION

Figure 1C:
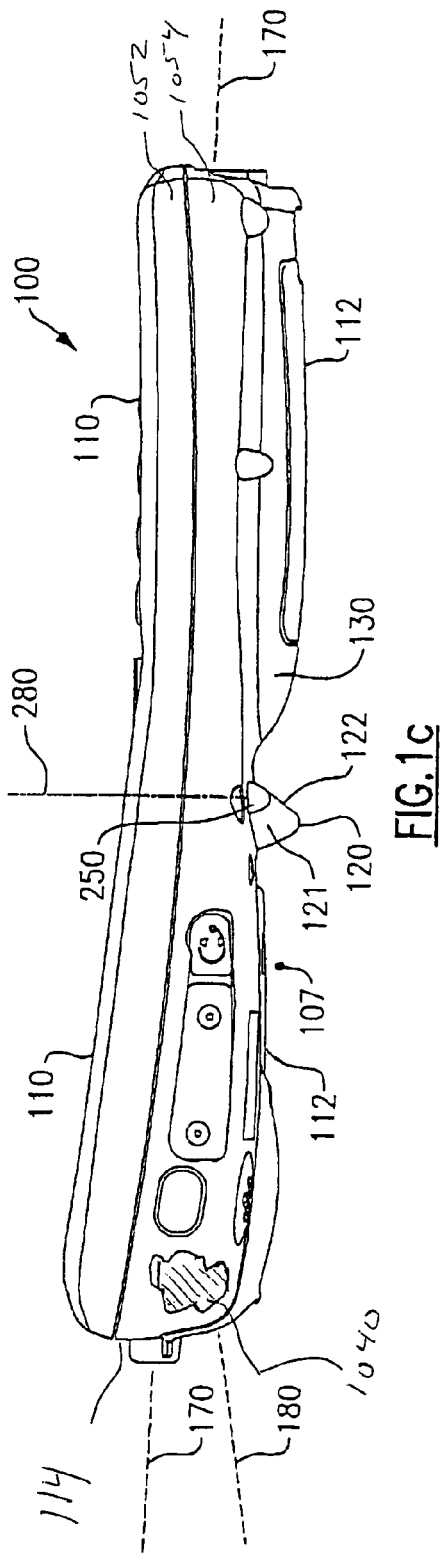
FIG. 1c is a side view of a hand held computer device according to the invention including a cutaway section to show an imaging assembly disposed within a housing of the device.

Features of device 100 according to the invention in one embodiment are shown generally in FIGS. 1a to 1d. Device 100 includes a hand held housing 105 having an upper surface 110, a lower surface 112, a front surface 114, and a rear surface 116. Finger saddle ridge 120 extends downwardly from lower surface 112 of housing to define a recess 107. Device 100 has a longitude axis 170. Imaging axis 180 of device 100 extends in the general direction of longitudinal axis 170 but may extend in a direction slightly angularly downward with respect to longitudinal axis 170 as is illustrated in FIGS. 1a and 1c. On upper surface 110 are disposed various user interface components including keyboard 190, a trigger button 150, a pointer controller 160 and a display 194. A touch screen overlay 195 (FIG. 2a) may be disposed over display 194. Housing 105 including saddle ridge finger 120 may comprise polycarbonate or another plastic.

Housing 105, typically including upper and lower clam shells 1052, 1054, may encapsulate a control circuit 1010 and associated imaging assembly 1040. Control circuit 1010 may be programmed to decode bar codes in accordance with a decoding algorithm. Information regarding various decoding bar code algorithms is available from the Association for Automatic Identification and Mobility ("AIM"), at www.aim-global.org.

Figure 2A:
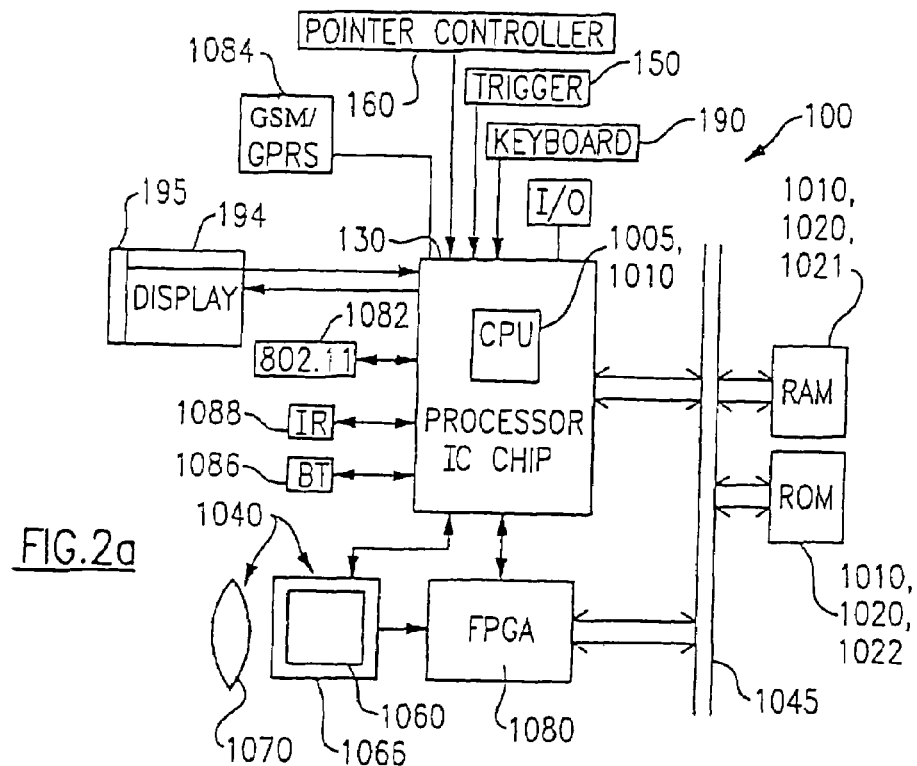
FIG. 2a is a block electrical diagram of a hand held computer device according to the invention.

A block electrical diagram of device 100 is shown in FIG. 2a. Control circuit 1010 includes a central processing unit 1005 and memory 1020. CPU 1005 may be disposed on processor IC chip, while memory 1020 may be incorporated partially in IC chip 130 and partially in a plurality of memory IC chips such as ROM IC chip 1022 and RAM IC chip 1021. ROM IC chip 1022 and RAM IC chip 1021 may be in communication with microprocessor IC chip via system bus 1045.

Figure 2B:
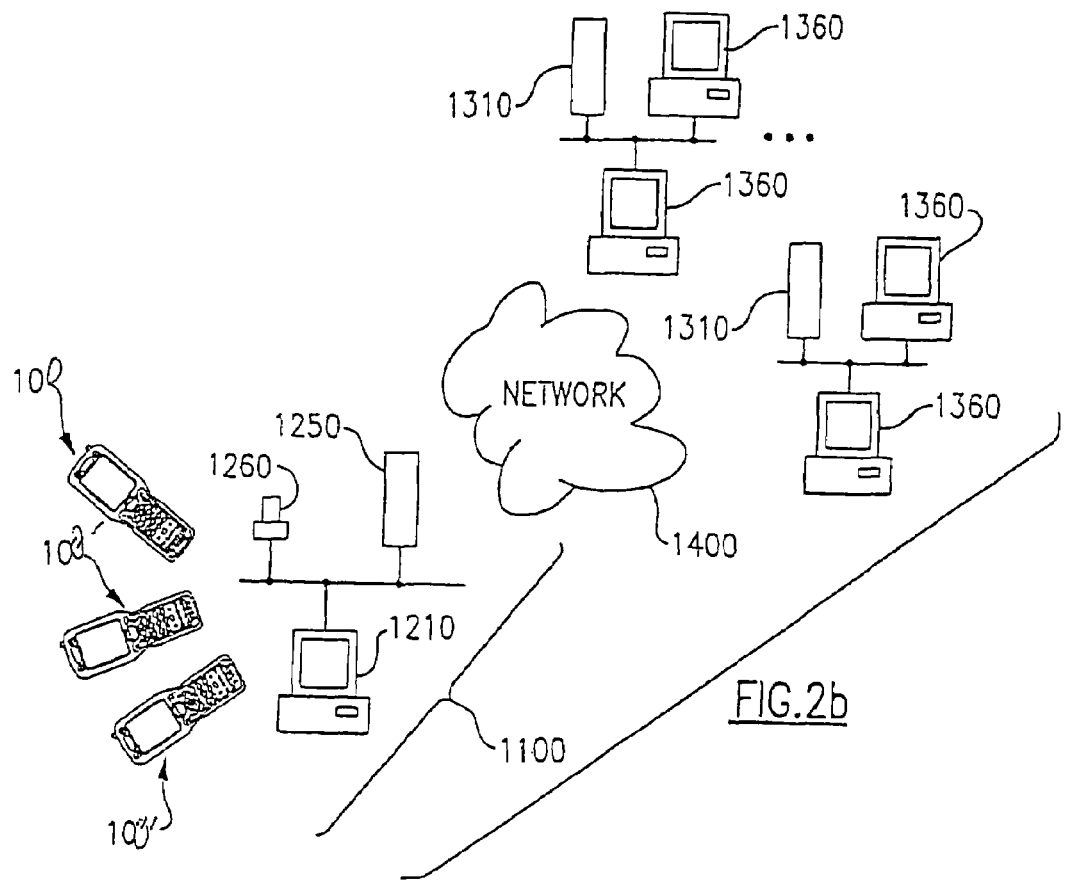
FIG. 2b is a block schematic diagram of a network according to the invention.
Figure 2C:
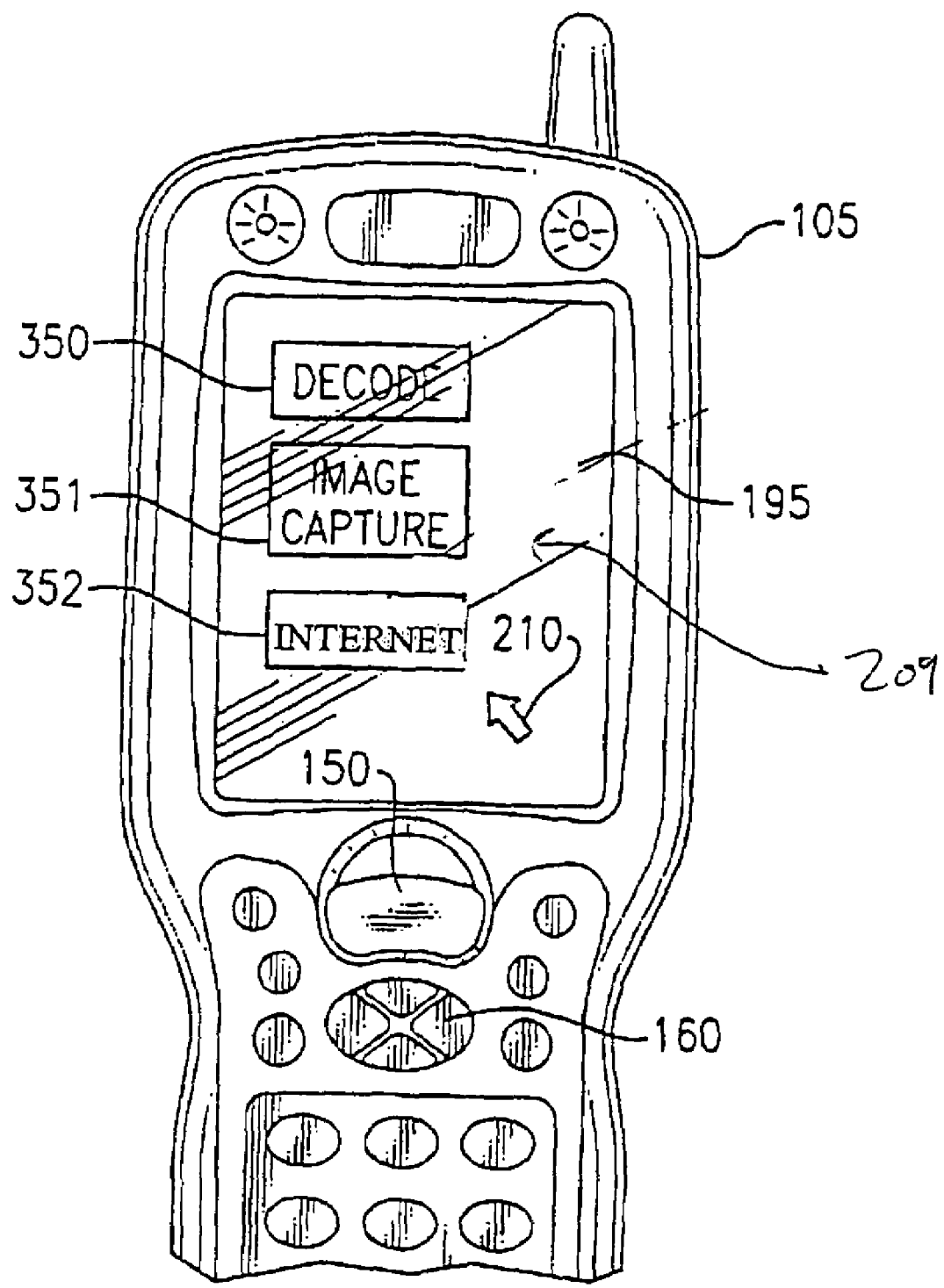
FIG. 2c is a top view of a hand held computer device according to the invention illustrating a graphical user interface, for use in making menu selections.

Referring to further elements of device 100, device 100 includes a display 194. Display 194 may have an associated touch screen overlay 195 so that display 194 operates as a data input interface. Device 100 may further have a keyboard 190 enabling input of data. Device 100 may also include a graphical user interface ("GUI") as illustrated in FIG. 2c. GUI 209 includes a pointer 210. Pointer 210 is moved by an operator to select between various displayed (sometimes referred to as "virtual") control buttons displayed on display 195. Pointer 210 may be moved during web browsing to select a text or icon hyperlink control button for highlighting. Control buttons may also be displayed for selecting between various menu options. As shown in FIG. 2c, the control buttons may be a series of icons 350, 351, 352. Selecting one of the icons changes the mode of operation of the device in accordance with the selected icon. Device 100 includes a pointer controller 160 enabling movement of pointer 210. In the specific embodiment of FIG. 2c, pointer controller 160 is provided by an arrow navigation matrix. Pointer controller 160 may also be provided by, e.g., a trackball or a joystick.

Device 100 also includes an image signal generating system provided by two dimensional solid state image sensor 1060, available in such technologies as CCD, CMOS, and CID. Two-dimensional solid state image sensors generally have a plurality of photosensor picture elements or pixels which are formed in a pattern including a plurality of rows and a plurality of columns of pixels. Device 100 further includes an imaging optics 1070 focusing an image onto an active surface of image sensor 1060. Image sensor 1060 may be incorporated on an image sensor IC chip 1066 having disposed thereon image sensor control circuitry, image signal conditioning circuitry, and an analog-to-digital converter. Device 100 may further include a field programmable gate array 1080 ("FPGA"). Operating under the control of control circuit 1010, FPGA 1080 manages the capture of image data into RAM 1021.

When trigger button 150 is actuated, control circuit 1010 automatically sends appropriate control signals to image sensor chip 1066. Image sensor chip 1066 in response thereto automatically exposes photosensitive pixels of image sensor 1060 to light and generates image signals. The image signals are thereafter automatically converted into digital values by image sensor IC chip 1066. The digital values are received by FPGA 1080 and transferred into RAM 1021. In accordance with a bar code decoding program stored in ROM 1022, control circuit 1010 may attempt to decode a bar code symbol represented in the captured image data. The capture of image data and decoding of image data occur automatically in response to trigger button 150 being actuated. Control circuit 1010 may be configured to continuously capture image data and attempt to decode bar code symbols represented therein as long as trigger button 150 is actuated.

In addition to having a decode mode of operation, device 100 may also be configured to include an image capture mode of operation. In an image capture mode of operation, control circuit 1010 captures an image in response to trigger button 150 being actuated without attempting to decode a decodable symbol represented therein. The captured image may be stored into a designated memory location of memory 1020, transmitted to an external spaced apart device (e.g., device 1250, 1210, 1360, 1310) automatically or in response to a user input command, or displayed on display 194 automatically or in response to a user input command.

Selection of various modes of operation may be made with use of a graphical user interface ("GUI") 209 as is depicted in FIG. 2c. GUI 209 displayed on display may include a plurality of control buttons in the form of selection icons, such as decoding icon 350, image capture icon 351, and web browsing icon 352. High level operating systems, such as Windows CE support GUI functionality. Selection of one of the icons, 350, 351, 352 drives device 100 into a mode of operation corresponding to the selected icon. As indicated in connection with FIG. 2c, pointer controller 160 may be used to move pointer 210.

When the control button provided by Internet icon 352 is selected, device 100 is driven into a web browsing mode of operation. Device 100 may incorporate a web browser for enabling device 100 to be utilized for navigating between websites disposed within various servers of the Internet. Available web browser software packages for hand held devices include WebPro 1.0 by Novarra, and/or WinWAP, available from Slob-Trot Software, Inc. and Pocket Internet Explorer available from Microsoft, Inc.

Imaging assembly 1040, which in the embodiment described thus far includes an image sensor chip 1066 and imaging optics 1070 may be provided by an IT4000 image engine of the type available from Hand Held Products, Inc. of Skaneateles Falls, N.Y. Imaging assembly 1040 may also be provided by a laser scan engine, such as an SEI000 scan engine of the type available from Symbol Technologies, Inc. of Holtsville, N.Y.

IC chip 130 may include a plurality of serial I/O interfaces such as general purpose I/O, USB, and Ethernet interfaces and a plurality of parallel interfaces such as CompactFlash and PCMCIA.

Device 100 may further include a plurality of communication links such as an 802.11 communication link 1082, a GSM/GPRS communication link 1084, a Bluetooth communication link 1086, and an IR communication link 1088 facilitating communication between device 100 and an external device spaced apart from device 100. As seen in FIG. 2b, device 100 may be part of a local area network ("LAN") including a spaced apart and separately housed local host processor 1210 and other hand held devices 100', 100". In addition to having wireless communication links, device 100 may include various physical connector interfaces such as "D-connector" interface 1090 enabling hard wired communication with host processor 1210. Device 100 may further be in communication with a plurality of offsite remote host processors 1310 located several miles to thousands of miles away from device 100. Remote host processors 1310 may be in communication with device 100 via a wide area network 1400, which may be the Internet. Device 100 may include a browser enabling a user of device 100 to view on device 100 a web page stored in one of a remote host processor 1310 and to navigate between websites stored on a variety of host processors 1310. Device 100 may communicate directly with network 1400 or indirectly with network 1400 by utilization of network elements of the local area network 1100 including device 100, device 100', and local host processor 1210. All of the components of FIG. 2a may be disposed in and supported by housing 105, as shown in FIG. 1a.

As seen in FIG. 1b, lower surface 112 of housing 105 has a finger saddle ridge 120 protruding downwardly there from. Finger saddle ridge 120, shown as being of a generally elongated and arcuate configuration, extends generally horizontally across lower surface 112 in a direction generally transverse to longitudinal axis 170. Finger saddle ridge 120 is sized and shaped to receive a pair of adjacent fingers of an operator; namely, a first finger and a second finger. When received on finger saddle ridge 120, an operator's first finger contacts front surface 121 of finger saddle ridge 120 while an operator's second finger contacts rear surface 122 of finger saddle ridge 120. Typically, the first finger is the operator's index finger and the second finger is the operator's middle finger. Finger saddle ridge 120 allows a user to firmly hold device 100 and enables improved user control over device 100. Finger saddle ridge 120 prevents slipping of device 100 forwardly or rearward. Forward slipping of device 100 is limited by contact between a first finger and front or forward surface 121 of finger saddle ridge 120. Rearward slipping of device 100 is limited by contact of a second finger with finger saddle ridge 120. In the embodiment shown, finger saddle ridge 120 extends in a direction generally transverse to longitudinal axis 170, and horizontally across lower surface 112.

Preferably, finger saddle ridge 120 is sized to receive a pair of adjacent fingers or an average sized adult human hand. Dimensional data (in millimeters) of one embodiment of device 100 is shown in FIGS. 4a-4e. However, it will be understood that dimensions of device 100 including ridge 120 can be varied without departing from the invention. In that human hands are of various sizes, each dimension presented in FIGS. 4a-4c can be varied without departing from the invention. Several alternative embodiments of the invention are shown in table form in Table 1.

TABLE 1

Figure 4A:
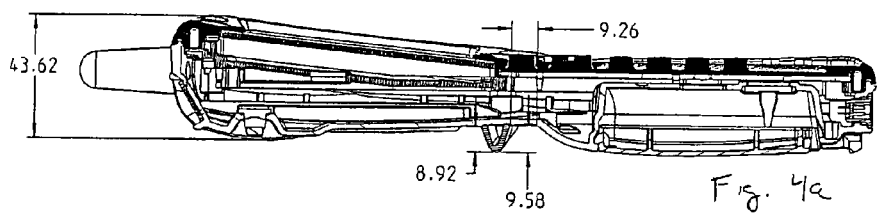
FIGS. 4a-4c are cross-sectional side, bottom and front views of an embodiment of the invention, respectively illustrating dimensional information.
Figure 4B:
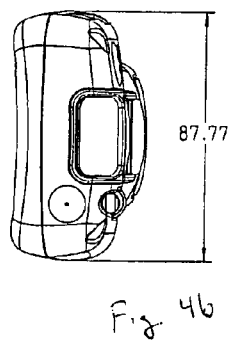
Figure 4C:
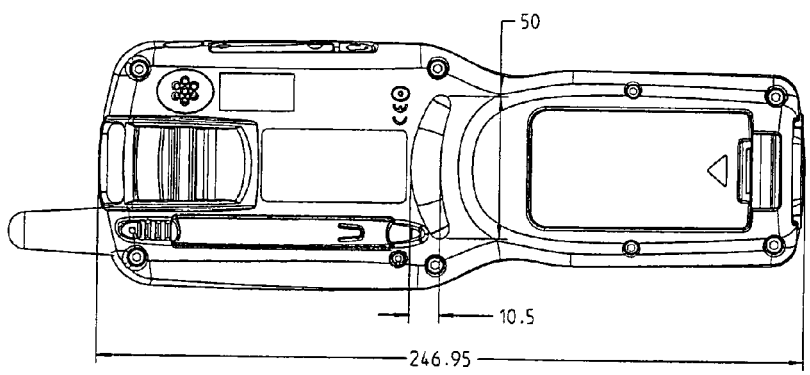

| Dimensions Relating to Ridge 120 (All Dimensions in Millimeters) | | | | |
|---|---|---|---|---|
| | Embodiment 1 | Embodiment 2 | Embodiment 3 | Embodiment 4 |
| Ridge height relative to surface 112 forward of ridge | 8.92 ± 10% | 8.92 ± 25% | 8.92 ± 50% | 8.92 ± 75% |
| Ridge height relative to surface 112 rearward of ridge | 9.58 ± 10% | 9.58 ± 25% | 9.58 ± 50% | 9.58 ± 75% |
| Ridge thickness (at horizontal center) | 10.50 ± 10% | 10.50 ± 25% | 10.50 ± 50% | 10.50 ± 75% |
| Ridge width | 50.00 ± 10% | 50.00 ± 25% | 50.00 ± 50% | 50.00 ± 75% |
| Spacing of ridge to auxiliary finger saddle 520 | 9.26 ± 10% | 9.26 ± 25% | 9.26 ± 50% | 9.26 ± 75% |
| Remaining dimensional features shown in FIGS. 4a-4c | ±10% | ±25% | ±50% | ±75% |

In FIGS. 4a-4c, all features are shown to scale. Accordingly, the dimensions of features shown but not expressly provided in FIGS. 4a-4c can be determined based on the size of the feature relative to a feature for which a dimension is provided.

As seen from the cross-section view of FIG. 1e taken along line e-e of FIG. 1b, finger saddle ridge 120 has a tapered configuration, including a gradually narrowing width from top (device end) to bottom. As seen in FIG. 1e, finger saddle ridge 120 also has a rounded crest. Such a configuration encourages the locating of fingers on finger saddle ridge 120. That is, fingers can be brought roughly into contact with finger saddle ridge 120, but will be readily spread into a straddling orientation with respect to finger saddle ridge 120 by the rounded crest and tapered configuration of finger saddle ridge 120. While finger saddle ridge 120 may have surfaces 121 and 122 that are substantially straight edged, finger saddle ridge 120 in the embodiment of FIGS. 1a-1d is accurate and both of surfaces 121 and 122 have substantially U-shaped configurations in a direction substantially parallel to longitudinal axis 170, so that device 100 conforms to an operator's hand and fingers in a naturally relaxed state.

In another aspect of the invention, side surfaces 113 of housing 105, as shown in FIGS. 1a and 1b are rounded. Configuring device 100 so that side surfaces 113 are rounded further enhances the capacity of device 100 to conform to the shape of a hand holding device 100, reducing the risk that housing 105 will cause discomfort to an operator or cause an operator to lose his/her grip of device 100 during use.

Figure 3A:
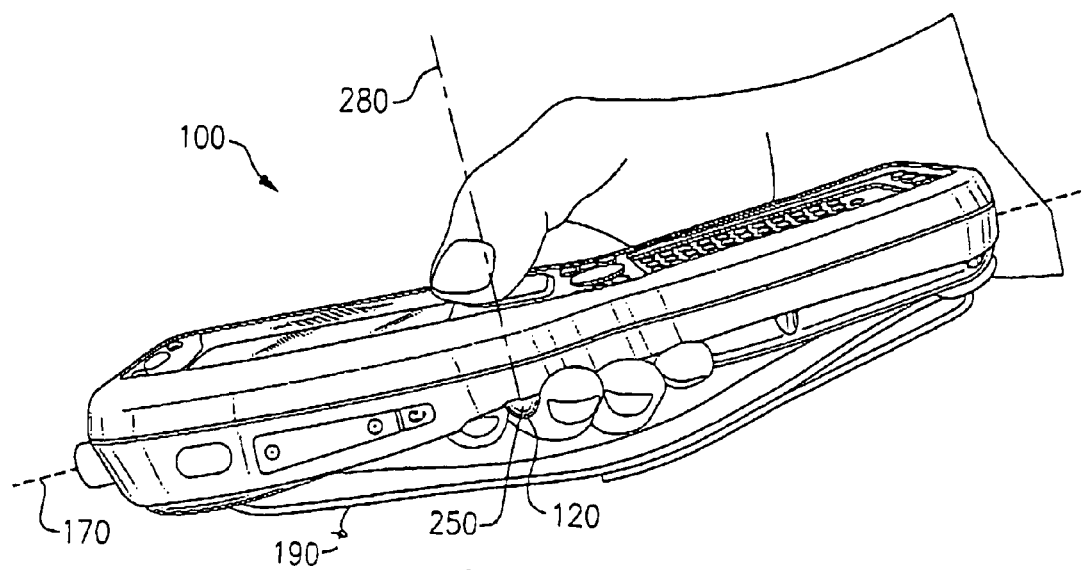
FIG. 3a is a perspective view of a hand held computer device according to the invention for illustrating downward pivoting of the device.
Figure 3B:
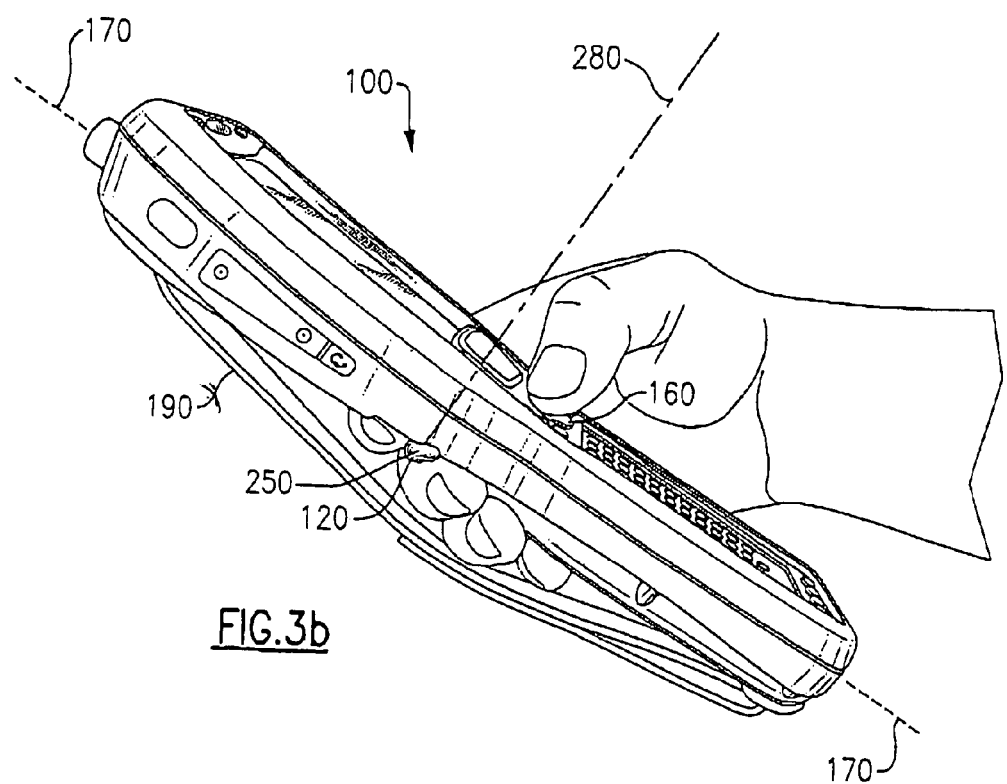
FIG. 3b is a perspective view of a hand held computer device according to the invention illustrating upward pivoting of the device.

In an important aspect of the invention, finger saddle ridge 120 provides a pivot axis 250 for allowing pivoting of device 100. When an operator straddles finger saddle ridge 120 with a first and second finger, finger saddle ridge 120 defines a pivot axis 250 about which housing 105 pivots. An operator can control the amount and direction of pivoting by imparting a force at a specific location on the upper surface 110 of device 100. Referring to FIGS. 3a and 3b, a ridge axis 280 is defined as a line extending through finger saddle ridge 120 in a direction perpendicular to longitudinal axis 170. Imparting a force forward of axis 280 encourages downward pivoting. Imparting a downward force on upper surface 110 rearward of ridge axis 280 encourages an upward pivoting of device 100.

Upward and downward pivoting can also be controlled without use of an operator's thumb. When straddled by a pair of fingers, device 100 can be pivoted simply with movement of the pair of adjacent fingers. Upward movement of a first finger relative to a second finger results in device 100 being pivoted upward. Upward movement of a second rear finger relative to a first forward finger results in device 100 being pivoted downward.

Upward and downward pivoting of device 100 critically enhances the ease of use of device 100, particularly when device 100 incorporates an imaging assembly 1040, and an associated decode module as has been described herein. In a bar code decode application, it is often advantageous to pivot device 100 downward for bar code reading, and then upward, so that messages and data displayed on display 194 can readily be viewed by an operator. Pivoting device 100 downward for bar code reading is advantageous in that bar codes are often found on horizontal table top or counter surfaces. In embodiments where imaging axis 180 is closer to parallel relative to device longitudinal axis 170, or angled parallel relative to longitudinal axis 170, there will often be a greater need to pivot device 100 downward during bar code reading. In use of device 100, it is common to execute the following steps in succession: (1) pivot device 100 downward; (2) actuate trigger 150 to capture an image and/or decode a bar code; (3) pivot device 100 upward and (4) view information on display 194 (such as a decoded message decoded in step (2) or a captured image captured in step (2)).

Trigger button 150 and pointer controller interface 160 are positioned with respect to pivot axis 250 and ridge axis 280 in a coordinated manner such that when trigger button 150 is actuated to decode a bar code, an operator's thumb will be positioned on top or upper surface 110 of device 100 in such position that downward pivoting of device 100 about pivot axis 250 is easily achieved. Specifically referring to FIG. 3a, it is seen that downward pivoting is achieved simply by sliding a thumb forward slightly, then exerting a downward force on surface 110. The downward force may be supplied at thumb rest 151 (see FIG. 1a) located adjacently forwardly relative to trigger button 150. Similarly, when pointer control 160 is actuated to move an arrow 210 (FIG. 1a), an operator's thumb is positioned on device 100 in such position that upward pivoting of device 100 about pivot axis 250 is easily achieved. Upward pivoting is achieved simply by imparting a downward force at pointer controller 160 (which is at a point rearward of ridge axis 280 in the embodiment of FIGS. 3a-3c). Pointer controller 160 is manipulated typically when display 194 is being viewed; for example, during menu icon selection, or during web browsing. It is highly advantageous to pivot device 100 upward during such applications. Accordingly, it is seen that trigger button 150, pointer controller 160, pivot axis 250, and ridge axis 280 are positioned on device 100 in a coordinated manner. Notably, it is observed that when pointer controller 160 is being manipulated for purposes of web browsing or selecting menu control buttons, device 100 will be naturally pivoted in an upward pivoted position by the force imparted by an operator's thumb on pointer controller 160. In such position, as has been noted, the information presented on display 194, such as a webpage or a menu selection screen, are readily observed by an operator.

While it is advantageous to configure device 100 so that device 100 can be readily moved into a downward pivoted position, it is also desirable to configure device 100 so that device 100 can be maintained in a highly stable position during image capture and bar code decoding (bar code decoding, as has been explained may include an image capture step). The sudden movement of device 100 (sometimes referred to as "jitter") during image capture could result in blurred, low quality images being captured. If the images are captured pursuant to a bar code decode attempt, the low quality images might yield a misread. If the images are captured pursuant to an image capture procedure without decoding, the captured images may be unsuitable for display or archiving purposes. Accordingly, in one aspect, as best seen in FIGS. 3a and 3b, trigger button 150 of upper surface 110 is positioned generally opposite finger saddle ridge 120 of lower surface 112. In one embodiment, ridge axis 280 passes through trigger button 150 to provide generally opposite positioning between trigger button 150 and finger saddle ridge 120. In another embodiment, ridge axis 280 passes through a position on upper surface 110 proximate trigger button 150 to provide generally opposite positioning between trigger button 150 and finger saddle ridge 120.

Figure 5A:
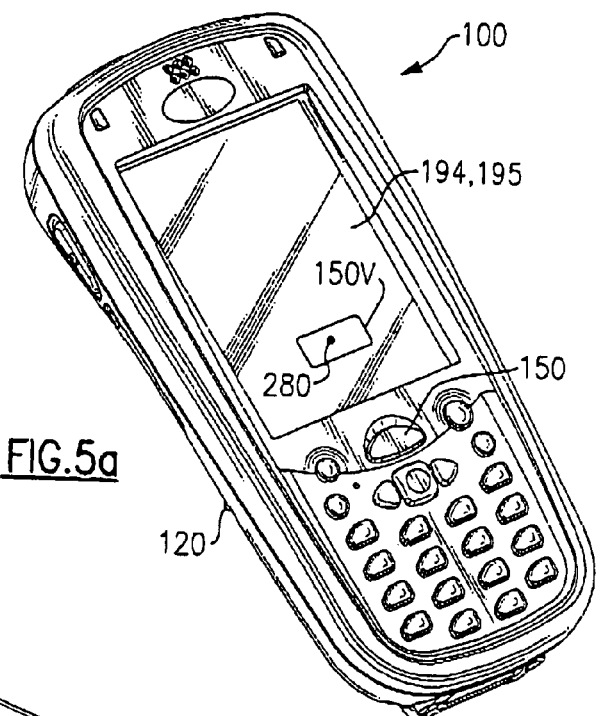
FIGS. 5a-5b are front and rear perspective views respectively of an embodiment of the invention having a PDA form factor.
Figure 5B:
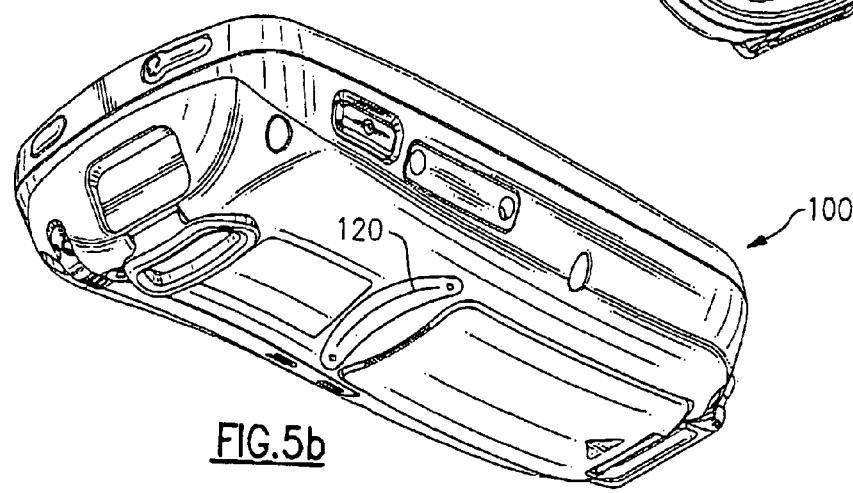
Figure 5C:
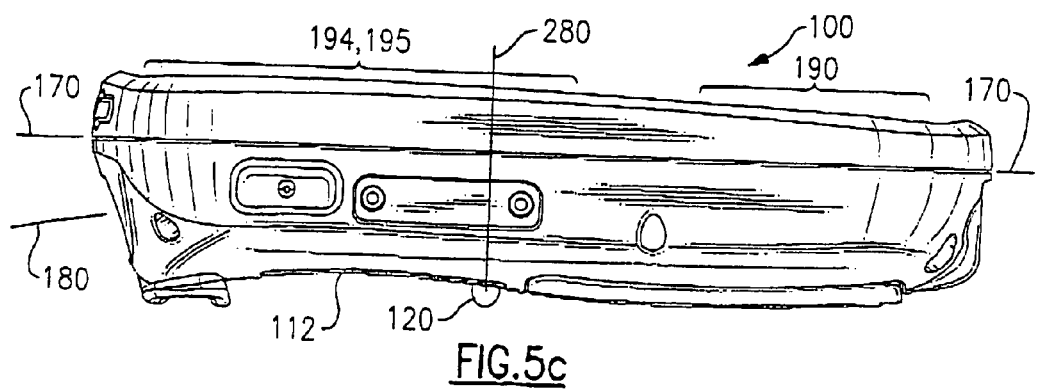
FIG. 5c is a side view of the embodiment shown in FIGS. 5a and 5b.
Figure 5D:
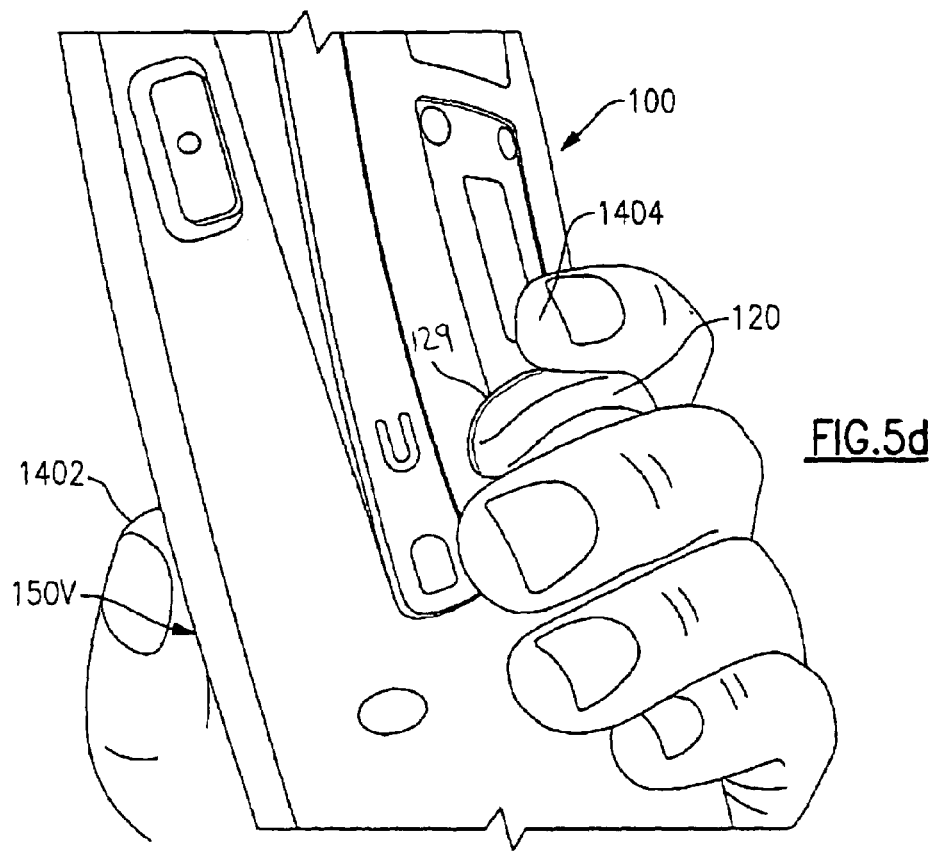
FIG. 5d is a side perspective view of a PDA embodiment of the invention being grasped by an operator.

As best seen in FIG. 5d, the positioning of trigger button 150 generally opposite of ridge 120 (so that ridge axis 280 intersects or nearly intersects trigger button 150) encourages an operator to place his/her hand on device 100 in such position that the operator's thumb 1402 and index finger 1404 substantially oppose one another. In such position, an operator's thumb and index finger are in a natural "pinching" position, allowing an operator to squeeze trigger button 150 or 150v with substantial force and excellent control to the end that jitter and the acquisition of poor quality images is readily avoided.

When trigger button 150 is positioned generally opposite finger saddle ridge 120, the imparting of a downward force on device 100 during the actuation of trigger button 150 does not cause unwanted jitter of device 100; since, with the opposing position of ridge 120 and trigger button 150, an operator's fingers will be in such position on device 100 that they oppose the force imparted by a thumb during trigger activation. Yet, with an operator's fingers located proximate trigger button 150, downward pivoting of device 100 is easily achieved simply by moving a thumb forward slightly and imparting a downward force.

In a still further aspect of the invention, finger saddle ridge 120 is disposed on lower surface 112 of device 100 at a point of balance on device 100. A point of balance of device 100 is a point at which device 100 may be supported without substantial gravity induced pivoting either upwardly or downwardly. The distribution of components within housing 105 may be controlled so that a desired point of balance is achieved. Weights may be incorporated in or on housing 105 for adjusting a point of balance. For further enhancing the stability of device 100, device 100 may include a hand strap 190. The tension of hand strap 190 may be adjusted so that hand strap 190 squeezes an operator's hand and fingers against lower surface 112.

Figure 1D:
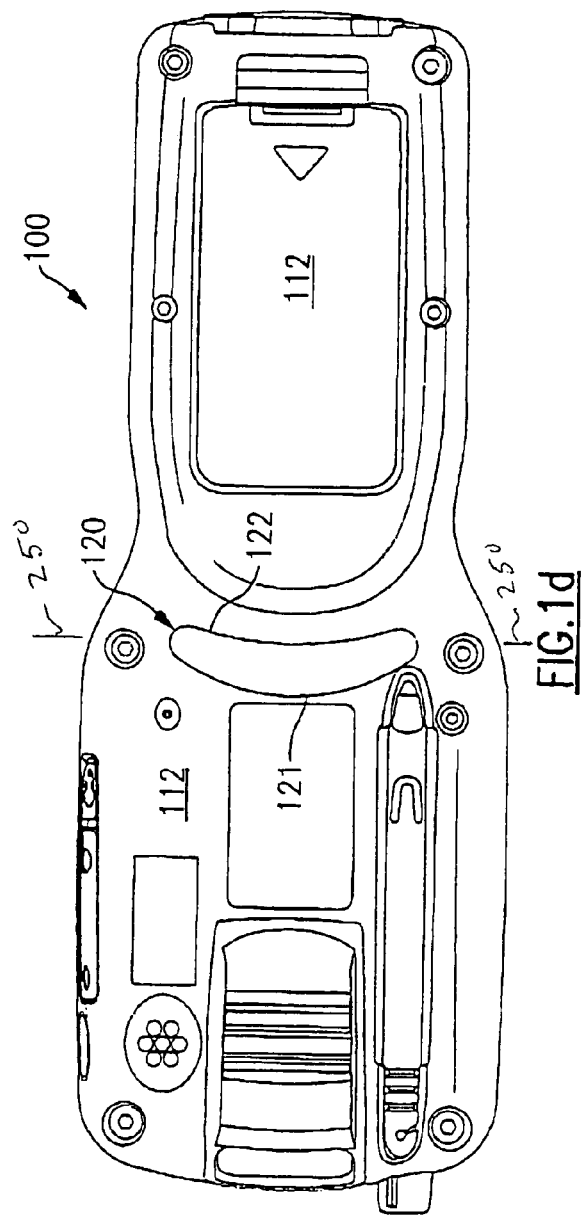
FIG. 1d is a bottom view of a hand held computer device according to the invention.

In further aspects of finger saddle ridge 120, finger saddle ridge 120 includes a generally U-shaped configuration in a direction approximately parallel to longitudinal axis 170 of device 100. As best seen in FIG. 1d, both front surface 121 and rear surface 122 of finger saddle ridge 120 generally have U-shaped configurations. Surfaces 121 and 122 having U-shaped configurations conform to the shape of an operator's fingers in a relaxed state, thus limiting the amount of unwanted movement of hands and fingers on device 100 during use. Further, when a user's fingers are in a relaxed state and conform to surfaces 121, 122 having U-shaped configurations, a user's thumb is naturally oriented upward and in such position that an operator's thumb can readily actuate keys of keyboard 190, pointer control 160, and trigger button 150.

In the embodiment of FIG. 3e, finger saddle ridge 120 is replaced with line 119 extending horizontally across lower surface. Line 119 comprises printed matter (e.g., ink, paint, dye) or a tactile surface. For line 119 to include tactile surface, the mold forming housing 105 may include appropriate mold features such that a textured surface (including e.g., bumps or grooves) is formed on housing 105 to define line 119. Line 119 may also be made tactile by using textured paint or coating during the formation of line 119. Line 119 may also be provided by a textured strip of tape (e.g., a sticker). Particularly where line 119 is disposed at a point of balance and/or a position to generally (that is, substantially) oppose trigger button 150, line 119 provides many of the advantages of finger saddle ridge 120. In particular, line 119 helps an operator to locate his finger on device 100 in such position that the device is readily pivoted upward or downward about the finger(s) positioned on line 119. Where trigger button 150 substantially opposes line 119 (such that line axis 179 intersects or approximately intersects trigger button 150 or 150v), line 119 aids the positioning of an operator's thumb and index finger in such position that trigger button 150 or 150v is actuated in a controlled manner without causing substantial jitter.

In a further aspect of device 100, finger saddle ridge 120 is disposed in association with an auxiliary finger saddle 520. Auxiliary finger saddle 520, as best seen in FIG. 1b is disposed rearward of finger saddle ridge 120. Auxiliary finger saddle 520 includes a surface 521 having a generally U-shaped configuration extending in a direction generally parallel to axis 170. In use of device 100 an operator can transfer the grasping of device 100 between various major grasping positions. In a first major grasping position, an operator holds device 100, as depicted in FIGS. 3a and 3b, by straddling finger saddle ridge 120 between two fingers. In a second major grasping position as depicted in FIG. 3c, an operator holds device 100 by conforming fingers of the same hand previously straddling finger saddle ridge 120 about auxiliary finger saddle 520.

In another aspect of the invention, the spacing between rear surface 122 of finger saddle ridge 120 and auxiliary finger saddle 520 is sized approximately to the width of an average sized adult human finger so that whether an operator grasps device 100 in a first grasping position as depicted in FIGS. 3a and 3b or in a second grasping position as depicted in FIG. 3c, the operator's fingers are located by finger saddle ridge 120 and by auxiliary finger saddle 520 in a stable position between finger saddle ridge 120 and auxiliary finger saddle 520. More particularly, in a first grasping position as depicted in FIGS. 3a and 3b, an operator's middle finger is typically located in a stable position between finger saddle ridge 120 and auxiliary finger saddle 520. In the second grasping position as depicted in FIG. 3c, an operator's index finger is located in a stable position between finger saddle ridge 120 and auxiliary finger saddle 520. As is illustrated in FIG. 3c, finger saddle ridge 120 is positioned in a coordinated manner with auxiliary finger saddle 520. Finger saddle ridge 120 is positioned more proximate to trigger button 150 than keyboard 190 and in one embodiment finger saddle ridge 120 is positioned generally opposite trigger button. Auxiliary finger saddle 520 is positioned more proximate keyboard 190 than finger saddle ridge 120 and in one embodiment is positioned on housing lower surface 112 generally opposite keyboard 190 of upper surface 110. Thus, it is seen that when an operator grasps device 100 in the first grasping position wherein a pair a fingers straddle finger saddle ridge 120 as shown in FIGS. 3a and 3b, the operator's thumb is in such position that it can be readily maneuvered into a position to actuate trigger button 150. When an operator grasps device 100 as shown in FIG. 3c in the second grasping position, it is seen that an operator's thumb is in such position that it can readily be maneuvered into various positions on keyboard 190. In a particular embodiment, keyboard 190 includes full numerical keyboard 190N, and auxiliary finger saddle 520 is positioned on lower surface 112 generally opposite full numerical keyboard 190N of upper surface 110.

Figure 5E:
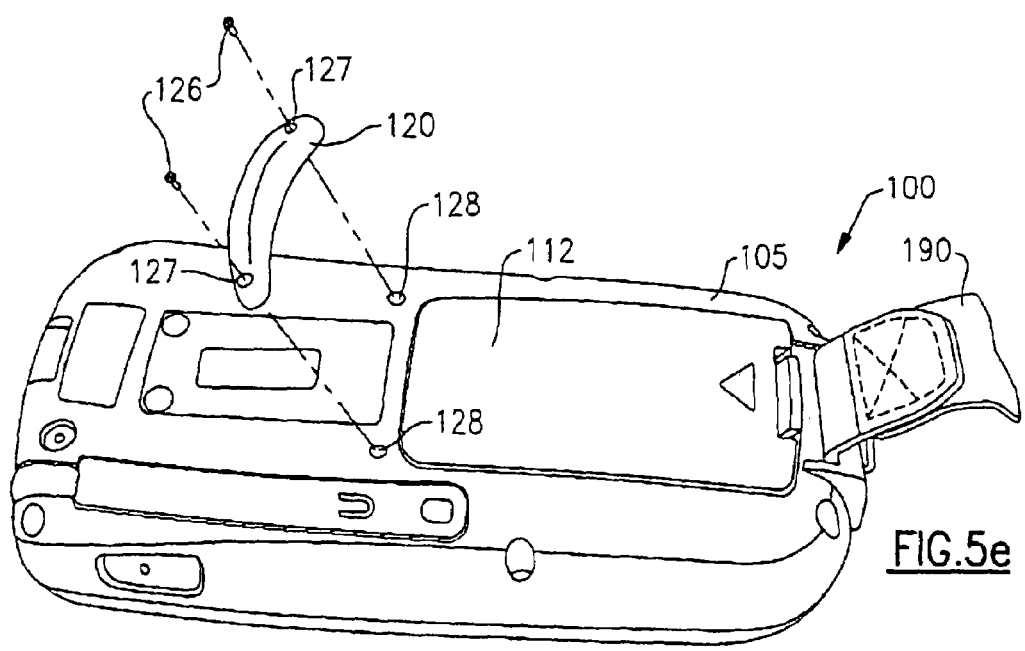
FIG. 5e is a bottom perspective view of an embodiment of the invention having a detachable finger saddle ridge.

Referring to manufacturing methods relative to the invention, finger saddle ridge 120 can be formed to be contiguous with the major body of housing 105. That is, a mold for making lower clam shell 1054 of housing 105 can include an appropriate feature so that finger saddle ridge 120 is formed at the time a mold for the major body of housing 105 is poured. Finger saddle ridge 120 can also be formed as a separate unit which is added onto the housing main body after manufacturing of the main body is completed. Finger saddle ridge 120 may be attached to surface 112 by ultrasonic welding, or with use of screws 126 as is indicated by the embodiments of FIG. 3d and FIG. 5e. In the embodiment of FIG. 5e, screw holes 128 are formed in the major body of housing 105, and screw holding holes 127 are formed in finger saddle ridge 120. Finger saddle ridge 120 is detachably attached to the major body of housing by inserting screws 126 into holes 127, and driving the screws 126 into screw holes 128. Finger saddle ridge 120 can also be attached to the main body of housing 105 with use of glue or double stick tape 129 (FIG. 5d), such as padded double stick tape. It will be understood that finger saddle ridge 120 may be sold as a unit separate from the remainder of device 100 as an add-on accessory. Further, ridge 120 may be manufactured by a first business entity and incorporated on devices that are manufactured by a second business entity. Ridge 120 may be shaped and sized so that it may be installed on several varieties of hand held computers.

In the embodiment of FIGS. 5a-5e, finger saddle ridge 120 is installed at a location on lower surface 112 such that ridge axis 280 does not intersect trigger button 150 as shown in FIG. 5a. Accordingly, to the end that additional benefits of the invention are yielded as have been described herein (ease of pivoting, "bracing" so that jitter is reduced) device 100 can be configured so that display 194 displays a virtual trigger button 150v at a position such as the one shown in FIG. 5a where ridge axis 280 intersects virtual trigger button 150. Device 100 can also be configured so that ridge axis 280 intersects or approximately intersects virtual trigger button 150v.

All or fewer than all of the following steps may be taken for configuring device 100 to include a finger saddle ridge 120, where ridge 120 is an add-on unit installed either at the place of manufacture of device, or in the field by an operator end-user of device 100: (1) determine a point of balance of device or adjust point of balance to a desired position by adding weights to device 100; (2) attach finger saddle ridge 120 on lower surface 112 at the point of balance; and (3) configure device 100 to include a virtual trigger button which generally opposes the finger saddle ridge 120 by positioning the virtual trigger button at such position that the virtual trigger button is intersected or nearly intersected by ridge axis of the ridge.

Features of the invention described thus far such as finger saddle ridge 120 and finger saddle 520 enhance the structural integrity of device 100 in that such features enable an operator to firmly and securely grasp device 100, thus reducing the incidence of such events as dropping of the device and unwanted collisions with foreign objects. The structural integrity of device 100 is further enhanced with the incorporation of certain structural support features, such as unitary can frame 1510, which are described with reference in FIGS. 6a-6e. Structural support features described with reference to FIGS. 6a-6e protect the device in the event device is dropped or unintentionally brought into contact with a foreign object.

Figure 6A:
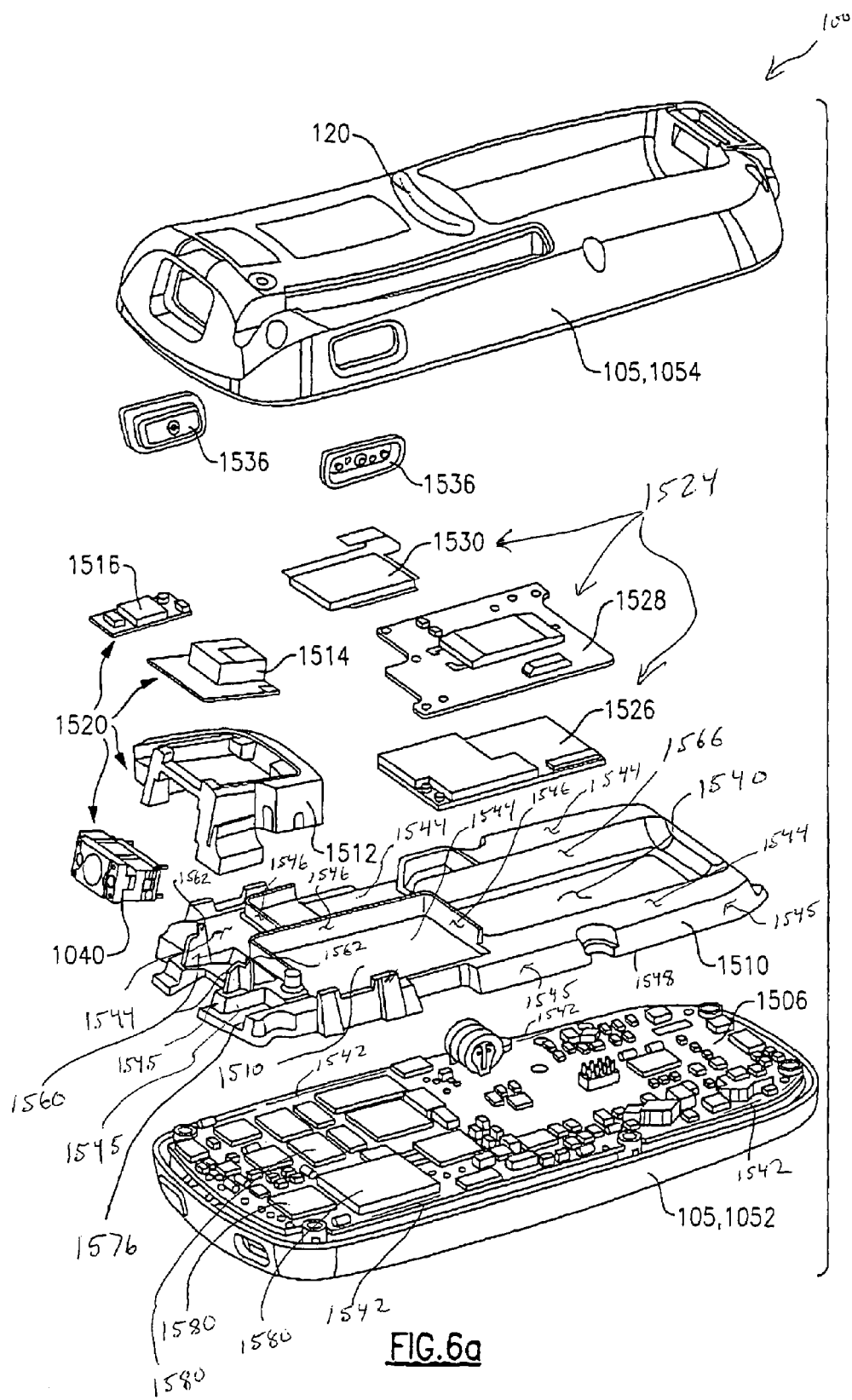
FIG. 6a is an exploded assembly view of an embodiment of the invention.
Figure 7A:
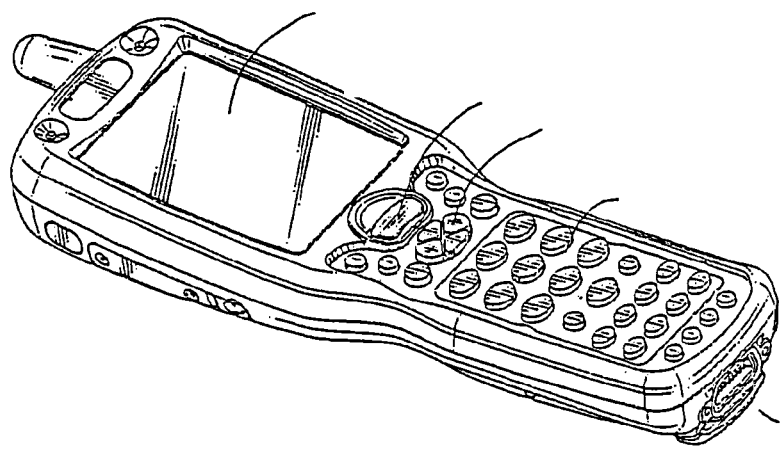
FIG. 7a is a front perspective view of an embodiment of the invention.
Figure 7B:
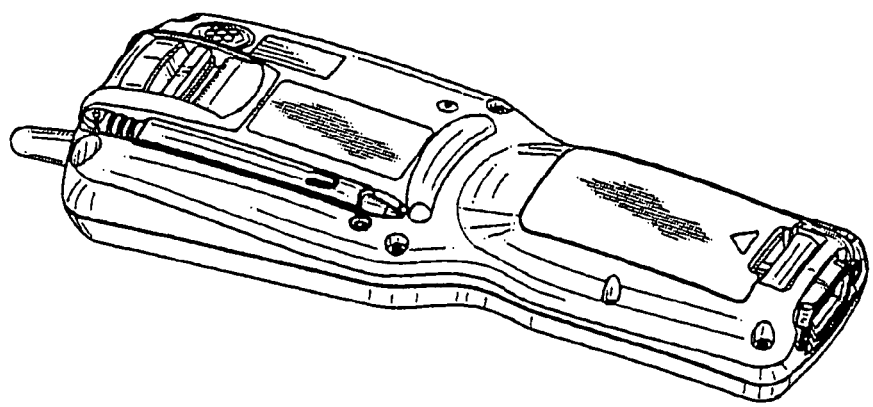
Figure 7C:
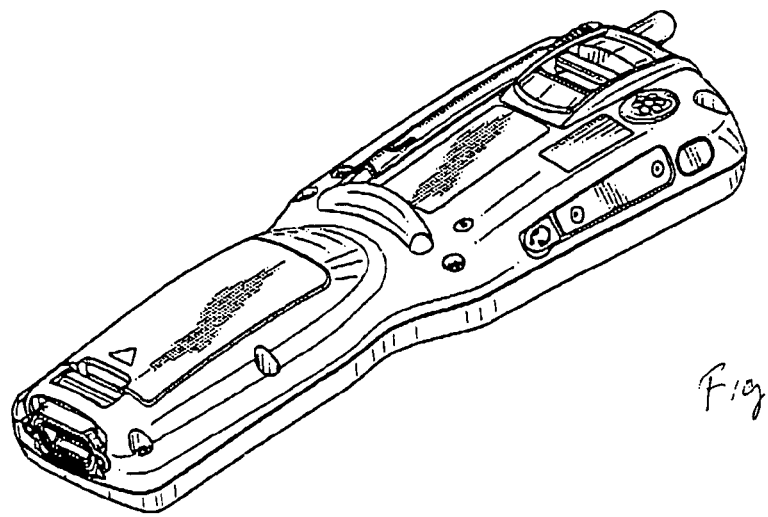
Figure 7D:
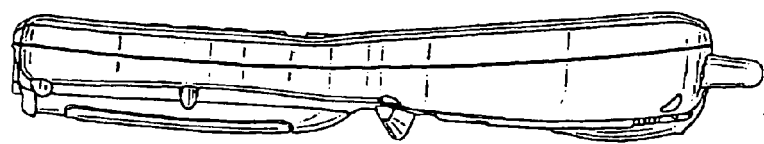
Figure 7E:
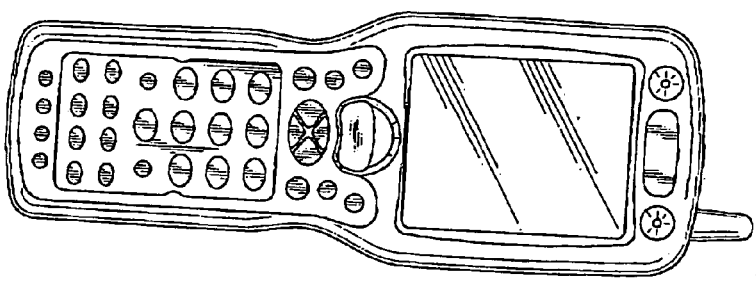
Figure 7F:
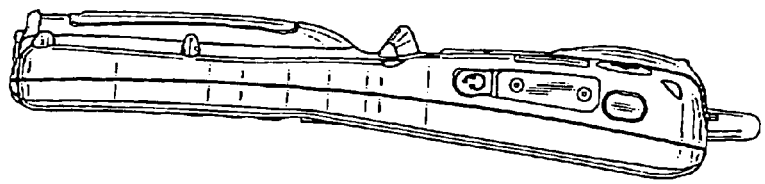
Figure 7G:
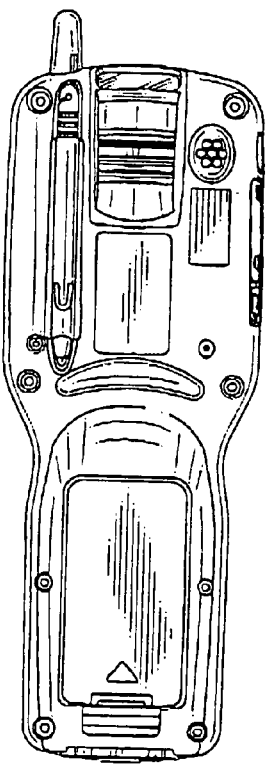
Figure 7H:
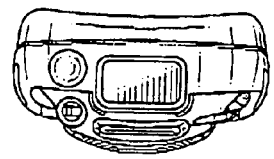
Figure 7I:

Housing 105 of device 100 may be of clam shell configuration as shown in the exploded assembly view of FIG. 6a. Housing 105 in the embodiment of FIG. 6a includes upper clam shell 1052 and lower clam shell 1054. For assembly of device 100, main printed circuit board 1506 is installed into upper clam shell 1052. Printed circuit board 1506 carries several of the circuit components of the circuit 1010 of FIG. 2a including processor IC chip 105 RAM 1021 and ROM 1022 and other electrical components of device 100. Main printed circuit board 1506 further has a ground path including ground contacts typically provided by a circuit board tracing 1542 (which is partially shown in the view of FIG. 6a). After main printed circuit board 1506 has been installed into upper claim shell 1052, can frame 1510 is then positioned over main printed circuit board 1506, and installed. Can frame 1510 comprises magnesium or another material suitable to provide electromatic interference (EMI) shielding to components of printed circuit board 1506. FIG. 6b shows device 100 having can frame 1510 installed over printed circuit board 1506. With printed circuit board 1506 and can frame 1510 installed, imaging assembly 1040 (shown as provided within an IT4000 imaging module of the type sold by Hand Held Products, Inc.) is fitted into radio frame 1512, together with 802.11 antenna module 1514 and Bluetooth radio module 1516. Radio frame 1512 comprises rubber. The radio assembly 1520 including radio frame 1512, imaging assembly 1040, 802.11 radio antenna 1514 and radio module 1516 is then installed onto can frame 1510. Device 100 having radio assembly 1520 installed on shielding frame 1510 is shown in the partial assembly view of FIG. 6c. Referring to further aspects of an exemplary device assembly process, an assembly 1524 including GSM radio module 1526, GSM power printed circuit board 1528 and mini secure digital connector flex assembly 1530 is further installed onto can frame 1510. Device 100 may further include programmable side buttons 1536. As indicated previously, lower clam shell 1054 may include finger saddle ridge 120 or else finger saddle ridge 120 may be added to lower claim shell 1054 as an add-on accessory.

Referring to further aspects of can frame 1510, can frame 1510 provides mechanical support to device 100, and, in addition, provides EMI shielding to electrical components of main circuit board 1506 and assemblies 1520, 1524. While can frame 1510 may be provided by any EMI shielding material, such as nickel, polycarbonate coated with nickel, can frame 1510 preferably comprises or consists of magnesium. Magnesium is lightweight, rigid, and, as a conductive material, provides EMI shielding. To the end that can frame 1510 provides an increased amount of support to components of device 100 and increased performance in terms of EMI shielding, can frame 1510 preferably is of unitary construction and preferably spans essentially an entire length and width of housing 105 as is best seen in FIGS. 6b and 6c so that a perimeter of can frame 1510 substantially throughout its length is in contact or near contact relation with an interior of housing 105. Can frame 1510 further is of the "can" configuration meaning that can frame 1510 has both a bottom 1544 and sidewalls 1545 extending generally transversing from the bottom 1544 to define a hollow interior. The hollow interior of can frame 1510 provides an important function in that it accommodates electrical components including the integrated circuit chips (e.g., chips 1580) on printed circuit board 1506 without contacting the electrical components. By covering electrical components on printed circuit board 1506, can frame 1510 protects the components structurally and shields the components from electromagnetic interference. The "can" configuration including sidewalls further enhances the structural strength of can frame 1510 relative to what it might otherwise be if provided, for example, a flat piece of metal. Still further, can frame 1510 includes a plurality of internal walls 1546 extending interiorly from sidewalls 1545. Internal walls 1546, which extend transversely relative to bottom 1554, define further cavities for the accommodation of electrical components, and further augment the structural strength of can frame 1510.

In another aspect, sidewalls 1545 of can frame 1510 terminate in a rim 1548. Rim 1548 is characterized by a substantially planar surface which as is best seen in the view of FIG. 6e extends substantially about the periphery of can frame 1510. Rim 1548 contacts printed circuit board 1506 in a plurality of locations including in several locations where ground contacts 1542 of printed circuit board 1506 are exposed. When can frame 1510 is installed onto printed circuit board 1506, can frame 1510 is forced into electrical contact with ground contacts 1542 and thus, when can frame 1510 is installed, can frame 1510 is in electrical contact with the system ground path of device 100.

In another aspect, can frame 1510 includes a plurality of mounting formations. Specifically, unitary can frame 1510 includes opposing receiving plates 1560 for locating and receiving imaging assembly 1040. Unitary can frame 1510 further includes pins 1564 and holes 1565. Pins 1564 and holes 1565 receive circuit board 1528 as best seen in FIG. 6c. Can frame 1510 further has a number of features (e.g., feature 1576) that are shaped to receive radio frame 1512. In addition, pins 1577 of unitary can frame 1510 are shaped to receive programmable side buttons 1536.

Still further, can frame 1510 includes a contoured (curved) surface 1566 for receiving a battery pack (not shown). In an important aspect, can frame 1510 includes a center aperture 1540. Center aperture 1540 of can frame 1510 allows electrical contact between main circuit board 1506 and another circuit board (e.g., board 1528) to readily be made without detracting from the structural support provided about the periphery of device 100 by can frame 1510. As seen in FIG. 6a, an entire perimeter of aperture 1540 is delineated by unitary can frame 1510. A flex strip (not shown) or another wire or wire grouping can be installed on main circuit board 1506, routed through aperture 1540, and connected to auxiliary circuit board (e.g., board 1528) spaced apart from circuit board 1506.

While the present invention has necessarily been described with reference to a number of specific embodiments, it will be understood that the time, spirit, and scope of the present invention should be determined only with reference to the following claims:

We claim:

1. A hand held computer device, said device comprising:
   an upper surface including at least one user interface component positioned thereon, said user interface component selected from the group consisting of a display, a pointer controller, a trigger button for actuating a sensor and a keyboard;
   a longitudinal axis;
   a lower surface; and
   a finger saddle ridge protruding downwardly from said lower surface, said finger saddle ridge having a front surface and a rear surface, said finger saddle ridge being sized to accommodate a pair of first and second adjacent human fingers, such that a first finger contacts a front surface and a second finger contacts said rear surface of said finger saddle ridge;
   wherein said at least one user interface component includes a trigger button and a pointer controller, and wherein said pointer controller is positioned on said upper surface rearward of said trigger button.

2. The hand held computer device of claim 1, wherein said finger saddle ridge extends in a generally horizontal direction across said lower surface.

3. The hand held computer device of claim 1, wherein said finger saddle ridge extends in a direction generally transverse to said longitudinal axis.

4. The hand held computer device of claim 1, wherein said front surface of said finger saddle ridge includes a generally U-shaped configuration, so that said front surface conforms to a shape of an operator's finger in a relaxed state.

5. The hand held computer device of claim 1, wherein said rear surface of said finger saddle ridge includes a generally U-shaped configuration, so that said rear surface conforms to a shape of an operator's finger in a relaxed state.

6. The hand held computer device of claim 1, wherein said front and rear surfaces of said finger saddle ridge each includes a generally U-shaped configuration, so that said front and rear surfaces conform to a shape of an operator's finger in a relaxed state.

7. The hand held computer device of claim 1, wherein said device further includes an auxiliary finger saddle ridge disposed rearward of said finger saddle ridge, said auxiliary finger saddle ridge including a generally U-shaped configuration extending in a direction generally parallel to said longitudinal axis.

8. The hand held computer device of claim 1, wherein said finger saddle ridge is detachably attached to said lower surface.

9. A portable data collection device configured to be held in a hand of an operator, said portable data collection device comprising:
   an imaging assembly;
   a control circuit coupled to said imaging assembly;
   a housing having an upper surface and a lower surface and a longitudinal axis, said housing encapsulating said imaging assembly and said control circuit;
   a trigger button disposed at said upper surface, wherein said portable data collection device is configured so that said control circuit captures electronic image data when said trigger button is actuated;
   a keyboard disposed at said upper surface adjacent said trigger button;
   a first finger saddle disposed at said lower surface, said first finger saddle having a surface for receiving an operator index finger while said operator holds said device in a first grasping position;
   a second finger saddle disposed at said lower surface, said second finger saddle having a surface for receiving an operator index finger while said operator holds said device in a second grasping position;
   wherein said first finger saddle is positioned more proximate said trigger button than said keyboard; and
   wherein said second finger saddle is positioned more proximate said keyboard than said trigger button.

10. The portable data collection device of claim 9, wherein said first finger saddle and said second finger saddle each have a generally U-shaped configuration extending in a direction generally parallel to said longitudinal axis.

11. The portable data collection device of claim 9, wherein said first finger saddle is positioned on said lower surface in a position generally opposite of said trigger button disposed on said upper surface.

12. The portable data collection device of claim 9, wherein said second finger saddle is positioned on said lower surface at a position generally opposite said keyboard disposed on said upper surface.

13. A portable data collection device comprising:
   a hand held housing having a longitudinal axis, an upper surface and a lower surface;
   a touch screen disposed on said upper surface;
   a finger saddle disposed on said lower surface having a U-shaped configuration extending in a direction generally parallel to said longitudinal axis so as to conform to a shape of an index finger in a relaxed state;
   a virtual trigger button displayed on said display at a position on said touch screen generally opposite said finger saddle so that when an operator's index finger is received by said finger saddle, a thumb of said operator is positioned proximate said trigger button and generally opposing said index finger.

14. The portable data collection device of claim 13, wherein said finger saddle is provided by a finger saddle ridge having a front surface receiving an index finger of an operator and a rear surface receiving a middle finger of an operator.

15. The portable data collection device of claim 13, wherein said touch screen comprises a display in combination with a touch screen overlay.

16. A portable computer comprising:
   a control circuit;
   a hand held housing having a longitudinal axis encapsulating said control circuit, said housing further having an upper surface and a lower surface;
   a user interface disposed on said upper surface;
   a line disposed on said lower surface for locating a finger of an operator, said line extending generally horizontally across said lower surface, said line being disposed on said lower surface generally opposite said user interface;
   wherein said portable computer further comprises a sensor and a touch screen, wherein said user interface is provided by a virtual trigger button displayed on said touch screen, said computer being configured so that said sensor is actuated when said virtual trigger button is depressed.

17. The portable computer of claim 16, wherein said line comprises printed matter.

18. The portable computer of claim 16, wherein said line comprises a tactile surface enabling said line to be felt by an operator when contacted.

19. The portable computer of claim 16, wherein said user interface is selected from the group consisting of a touch screen, a trigger button for actuating a sensor, a pointer controller, and a keyboard.

20. The portable computer of claim 16, further comprising a sensor, wherein said user interface is provided by a trigger button which when depressed actuates said sensor.

21. The portable computer of claim 16, further comprising a sensor and a touch screen, wherein said user interface is provided by a virtual trigger button displayed on said touch screen, said computer being configured so that said sensor is actuated when said virtual trigger button is depressed.

22. A hand held computer device, said device comprising:
an upper surface including at least one user interface component positioned thereon, said user interface component selected from the group consisting of a display, a pointer controller, a trigger button for actuating a sensor and a keyboard;
a longitudinal axis;
a lower surface; and
a finger saddle ridge protruding downwardly from said lower surface, said finger saddle ridge having a front surface and a rear surface, said finger saddle ridge being sized to accommodate a pair of first and second adjacent human fingers, such that a first finger contacts a front surface and a second finger contacts said rear surface of said finger saddle ridge;
wherein said hand held computer device further includes an auxiliary finger saddle ridge disposed rearward of said finger saddle ridge, said auxiliary finger saddle ridge including a generally U-shaped configuration extending in a direction generally parallel to said longitudinal axis.

23. The hand held computer device of claim 22, wherein said at least one user interface component includes a trigger button and a pointer controller, and wherein said pointer controller is positioned on said upper surface rearward of said trigger button.

24. The hand held computer device of claim 22, wherein said finger saddle ridge extends in a direction generally transverse to said longitudinal axis.

25. The hand held computer device of claim 22, wherein said front and rear surfaces of said finger saddle ridge includes a generally U-shaped configuration, so that said front and rear surfaces conform to a shape of an operator's finger in a relaxed state.

26. A hand held computer device, said device comprising:
an upper surface including at least one user interface component positioned thereon, said user interface component selected from the group consisting of a display, a pointer controller, a trigger button for actuating a sensor and a keyboard;
a longitudinal axis;
a lower surface; and
a finger saddle ridge protruding downwardly from said lower surface, said finger saddle ridge having a front surface and a rear surface, said finger saddle ridge being sized to accommodate a pair of first and second adjacent human fingers, such that a first finger contacts front surface and a second finger contacts said rear surface of said finger saddle ridge, said finger saddle ridge having a narrow cross sectional width taken along a plane extending from a front of said hand held computer device to a back of said hand held computer device, the cross sectional width narrowing in a direction from a top of said device to a bottom of said device.

27. The hand held computer device of claim 26, wherein said at least one user interface component includes a trigger button and a pointer controller, and wherein said pointer controller is positioned on said upper surface rearward of said trigger button.

28. The hand held computer device of claim 26, wherein said finger saddle ridge extends in a direction generally transverse to said longitudinal axis.

29. The hand held computer device of claim 26, wherein said front and rear surfaces of said finger saddle ridge includes a generally U-shaped configuration, so that said front and rear surfaces conform to a shape of an operator's finger in a relaxed state.

30. The hand held computer device of claim 26, wherein at least one of said front surface or rear surface of said finger saddle ridge includes a generally U-shaped configuration extending in a direction generally parallel to said longitudinal axis in such manner that said U-shaped configuration is visible from a bottom view of said hand held computer device.

31. The hand held computer device of claim 26, wherein said finger saddle ridge is detachably attached to said lower surface.

32. The hand held computer device of claim 26, wherein said front and rear surfaces of said finger saddle ridge includes a generally U-shaped configuration, so that said front and rear surfaces conform to a shape of an operator's finger in a relaxed state.

33. A hand held computer device comprising:
a hand held housing having an upper surface and a lower surface, and a longitudinal axis;
at least one user interface disposed on said upper surface, said at least one user interface selected from the group consisting of a touch screen, a trigger button, a pointer controller, and a keyboard;
a finger saddle ridge protruding downwardly from said lower surface and extending in a direction generally transverse to said longitudinal axis, said finger saddle ridge having a front surface adapted to receive an index finger of an operator and a rear surface adapted to receive a middle finger of said operator so that forward slippage of said hand held housing is limited by contact of said index finger with said front surface and further so that rearward slippage of said hand held housing is limited by contact of said middle finger with said rear surface of said finger saddle ridge, said finger saddle ridge having a narrowing cross sectional width taken along a plane extending from a front of said hand held computer device to a back of said hand held computer device, the cross sectional width narrowing in a direction from a top of said hand held computer device to a bottom of said hand held computer device.

34. The hand held computer device of claim 33, wherein said finger saddle ridge is adapted to be detachably attached to a major body of said housing.

35. The hand held computer device of claim 33, wherein said finger saddle ridge is arcuate.

36. The hand held computer device of claim 33, wherein said front surface has a generally U-shaped configuration in a direction generally parallel to said longitudinal axis so that said front surface conforms to a shape of said index finger in a relaxed state.

37. The hand held computer device of claim 33, wherein said at least one user interface is a trigger button, wherein said trigger button is positioned on said upper surface generally opposite said finger saddle ridge.

38. The hand held computer device of claim 33, further comprising a first circuit board disposed within said housing and carrying electrical components and having at least one ground contact, said hand held computer device further having can frame of unitary construction, said can frame disposed over said circuit board and extending lengthwise and widthwise within said housing so that a perimeter of said can frame substantially throughout its length is in contact or near contact relation with interior walls of said housing, said can frame having a bottom and sidewalls extending transversely relative to said bottom to define a hollow interior for accommodation of said electrical components, said sidewalls terminating in a rim that contacts said at least one ground contact, said can frame further having at least one internal wall increasing structural integrity of said can frame, said can frame further having a structural support member defined thereon for supporting at least one of an imaging module, a second circuit board, a radio assembly, and a battery pack, said can frame further having an aperture accommodating electrical wiring extending from a first side of said can frame to a second side of said can frame.

39. The hand held computer device of claim 33, wherein said finger saddle ridge has a rounded crest at a bottom thereof.

40. A hand held computer device, said device comprising:
an upper surface including at least one user interface component positioned thereon, said user interface component selected from the group consisting of a display, a pointer controller, a trigger button for actuating a sensor and a keyboard;
a longitudinal axis;
a lower surface; and
a finger saddle ridge protruding downwardly from said lower surface, said finger saddle ridge having a front surface and a rear surface, said finger saddle ridge being sized to accommodate a pair of first and second adjacent human fingers, such that a first finger contacts front surface and a second finger contacts said rear surface of said finger saddle ridge;
wherein at least one of said front surface and said rear surface of said finger saddle ridge includes a generally U-shaped configuration extending in a direction generally parallel to said longitudinal axis in such manner that said U-shaped configuration is visible from a bottom view of said device.

41. The hand held computer device of claim 40, wherein said at least one user interface component includes a trigger button and a pointer controller, and wherein said pointer controller is positioned on said upper surface rearward of said trigger button.

42. The hand held computer device of claim 40, wherein said finger saddle ridge extends in a direction generally transverse to said longitudinal axis.

43. The hand held computer device of claim 40, wherein at least one of said front surface or said rear surface of said finger saddle includes a generally U-shaped configuration, so that at least one of said front surface or said rear surface of said finger saddle ridge conforms to a shape of an operator's finger in a relaxed state.

44. The hand held computer device of claim 40, wherein said device further includes an auxiliary finger saddle ridge disposed rearward of said finger saddle ridge, said auxiliary finger saddle ridge including a generally U-shaped configuration extending in a direction generally parallel to said longitudinal axis.

45. The hand held computer device of claim 40, wherein said hand held computer device includes a narrow cross sectional width taken along a plane extending from a front of said hand held computer device to a back of said hand held computer device, the cross sectional width narrowing in a direction from a top of said device to a bottom of said device.

46. The hand held computer device of claim 40, wherein said finger saddle ridge includes a rounded crest at a bottom thereof.

47. A hand held computer device comprising:
a hand held housing having an upper surface and a lower surface, and a longitudinal axis;
at least one user interface disposed on said upper surface, said at least one user interface selected from the group consisting of a touch screen, a trigger button, a pointer controller, and a keyboard;
a finger saddle ridge protruding downwardly from said lower surface and extending in a direction generally transverse to said longitudinal axis, said finger saddle ridge having a front surface adapted to receive an index finger of an operator and a rear surface adapted to receive a middle finger of said operator so that forward slippage of said hand held housing is limited by contact of said index finger with said front surface and further so that rearward slippage of said hand held housing is limited by contact of said middle finger with said rear surface of said finger saddle ridge;
wherein at least one of a front and rear surface of said finger saddle ridge includes a generally U-shaped configuration extending in a direction generally parallel to said longitudinal axis in such manner that said U-shaped configuration is visible from a bottom view of said hand held computer device.

48. The hand held computer device of claim 47, wherein said finger saddle ridge is adapted to be detachably attached to a major body of said housing.

49. The hand held computer device of claim 47, wherein said finger saddle ridge is arcuate.

50. The hand held computer device of claim 47, wherein said front surface has a generally U-shaped configuration in a direction generally parallel to said longitudinal axis so that said front surface conforms to a shape of said index finger in a relaxed state.

51. The hand held computer device of claim 47, wherein said at least one user interface is a trigger button, wherein said trigger button is positioned on said upper surface generally opposite said finger saddle ridge.

52. The hand held computer device of claim 47, further comprising a first circuit board disposed within said housing and carrying electrical components and having at least one ground contact, said hand held computer device further having can frame of unitary construction, said can frame disposed over said circuit board and extending lengthwise and widthwise within said housing so that a perimeter of said can frame substantially throughout its length is in contact or near contact relation with interior walls of said housing, said can frame having a bottom and sidewalls extending transversely relative to said bottom to define a hollow interior for accommodation of said electrical components, said sidewalls terminating in a rim that contacts said at least one ground contact, said can frame further having at least one internal wall increasing structural integrity of said can frame, said can frame further having a structural support member defined thereon for supporting at least one of an imaging module, a second circuit board, a radio assembly, and a battery pack, said can frame further having an aperture accommodating electrical wiring extending from a first side of said can frame to a second side of said can frame.

53. The hand held computer device of claim 52, wherein said aperture has a perimeter entirely delimited by said can frame.

54. The hand held computer device of claim 47, wherein said hand held computer device includes a narrow cross sectional width taken along a plane extending from a front of said hand held computer device to a back of said hand held computer device, the cross sectional width narrowing in a direction from a top of said device to a bottom of said device.

55. The hand held computer device of claim 47, wherein said finger saddle ridge includes a rounded crest at a bottom thereof.

* * * * *

UNITED STATES PATENT AND TRADEMARK OFFICE
CERTIFICATE OF CORRECTION

PATENT NO. : 7,446,753 B2  Page 1 of 1
APPLICATION NO. : 10/938416
DATED : November 4, 2008
INVENTOR(S) : Timothy R. Fitch et al.

It is certified that error appears in the above-identified patent and that said Letters Patent is hereby corrected as shown below:

Column 13, line 63 change "control circuit captures" to --said control circuit captures--.

Column 14, line 4 change "first grasping position;" to --first grasping position; and--.

Column 14, line 32 change "a relaxed state;" to --a relaxed state; and--.

Column 14, line 51 change "said upper surface;" to --said upper surface; and--.

Column 15, line 44 change "includes a generally" to --each includes a generally--.

Column 15, line 59 change "finger contacts front" to --finger contacts said front--.

Column 16, line 11 change "includes a generally" to --each includes a generally--.

Column 16, line 34 change "and a keyboard;" to --and a keyboard; and--.

Column 17, line 3 change "can frame of unitary" to --a can frame of unitary--.

Column 17, line 35 change "finger contacts front" to --finger contacts said front--.

Column 18, line 12 change "and a keyboard;" to --and a keyboard; and--.

Column 18, line 48 change "can frame of unitary" to --a can frame of unitary--.

Signed and Sealed this

Seventeenth Day of March, 2009

JOHN DOLL
*Acting Director of the United States Patent and Trademark Office*